United States Patent
Habib

(10) Patent No.: US 12,136,280 B2
(45) Date of Patent: Nov. 5, 2024

(54) SYSTEM AND METHOD FOR SYNCHRONIZING 2D CAMERA DATA FOR ITEM RECOGNITION IN IMAGES

(71) Applicant: Agilysys NV, LLC, Alpharetta, GA (US)

(72) Inventor: Md Ahsan Habib, Kirkland, WA (US)

(73) Assignee: Agilysys NV, LLC, Alpharetta, GA (US)

( * ) Notice: Subject to any disclaimer, the term of this patent is extended or adjusted under 35 U.S.C. 154(b) by 423 days.

(21) Appl. No.: 17/712,968

(22) Filed: Apr. 4, 2022

(65) Prior Publication Data

US 2023/0316786 A1    Oct. 5, 2023

(51) Int. Cl.
*G06K 9/00*    (2022.01)
*G06T 7/70*    (2017.01)
(Continued)

(52) U.S. Cl.
CPC .............. *G06V 20/647* (2022.01); *G06T 7/70* (2017.01); *H04N 23/90* (2023.01);
(Continued)

(58) Field of Classification Search
CPC ........ G06V 20/647; G06V 20/52; G06T 7/70; G06T 2207/10004; G06T 2207/20081;
(Continued)

(56) References Cited

U.S. PATENT DOCUMENTS

| | | |
|---|---|---|
| 10,366,445 B2 | 7/2019 | Dhankhar |
| 10,467,454 B2 | 11/2019 | Srivastava et al. |
| | (Continued) | |

FOREIGN PATENT DOCUMENTS

| | | | |
|---|---|---|---|
| EP | 3076372 A1 * | 10/2016 | ......... G06K 9/00771 |
| EP | 3518149 | 7/2019 | |
| WO | WO-2021100043 A2 * | 5/2021 | ............. G06T 7/292 |

OTHER PUBLICATIONS

International Search Report and Written Opinion received for counterpart International Application No. PCT/US2023/065279 mailed Jun. 22, 2023 (17 pages).

(Continued)

*Primary Examiner* — Shervin K Nakhjavan
(74) *Attorney, Agent, or Firm* — Perkins Coie LLP

(57) ABSTRACT

A system and method for synchronizing two-dimensional ("2D") camera data for object recognition. An object recognition kiosk includes a plurality of 2D cameras and a stage for placement of one or more items. The plurality of 2D cameras, one of which acts as a reference camera, capture images of items on the stage from multiple angles. The system synchronizes image data from each camera in order to accurately identify items present on the stage. In situations where items in camera images fail to be linked to items identified in the reference camera perspective, the system maintains a fallback hierarchy of camera pairs to utilize to link items found in different camera images. The use of different camera pairs to link item detections continues down the fallback hierarchy until either all the item detections are linked or the last camera pair in the fallback hierarchy is reached.

20 Claims, 19 Drawing Sheets

(51) Int. Cl.
*G06V 20/64* (2022.01)
*H04N 23/90* (2023.01)

(52) U.S. Cl.
CPC .............. *G06T 2207/10004* (2013.01); *G06T 2207/20081* (2013.01); *G06T 2207/20212* (2013.01)

(58) Field of Classification Search
CPC .......... G06T 2207/20212; H04N 23/90; G06Q 20/18; G06Q 20/208; G07G 1/0036
See application file for complete search history.

(56) References Cited

U.S. PATENT DOCUMENTS

| | | | |
|---|---|---|---|
| 10,540,551 | B2 | 1/2020 | Srivastava et al. |
| 10,628,695 | B2 | 4/2020 | Srivastava et al. |
| 10,803,292 | B2 * | 10/2020 | Srivastava ............. H04N 23/60 |
| 10,922,554 | B2 * | 2/2021 | Koo ...................... G06V 40/103 |
| 11,263,498 | B2 * | 3/2022 | Kim ........................... G06T 7/70 |
| 11,546,503 | B1 * | 1/2023 | Kundu .................... H04N 7/181 |
| 11,558,539 | B2 * | 1/2023 | Kramarov .............. H04N 23/69 |
| 11,568,550 | B2 * | 1/2023 | Liu ......................... H04N 23/90 |
| 11,770,506 | B2 * | 9/2023 | Kerst ......................... G06T 7/73 348/159 |
| 2015/0310601 | A1 | 10/2015 | Rodriguez et al. |
| 2019/0236360 | A1 * | 8/2019 | Srivastava ........ G06F 18/24137 |
| 2019/0320117 | A1 * | 10/2019 | Wu ............................ G06T 7/70 |
| 2021/0125354 | A1 * | 4/2021 | Boulio ................ G06Q 30/0201 |
| 2022/0272255 | A1 * | 8/2022 | Xiong .................. H04N 23/695 |
| 2022/0391620 | A1 * | 12/2022 | Spiteri .................... G06T 7/292 |
| 2022/0414587 | A1 * | 12/2022 | Maung .................. G06V 20/52 |
| 2023/0419670 | A1 * | 12/2023 | Nakamura ........... G06V 40/103 |

OTHER PUBLICATIONS

Yin Fei et al: "Calibration and object correspondence in camera networks with widely separated overlapping views," IET Computer Vision, The Institution of Engineering and Technology, Michael Faraday House, Six Hills Way, Stevenage, Herts. SG1 2AY, UK, vol. 9, No. 3, (Jun. 2015), pp. 354-367, XP006052268, ISSN: 1751-9632, DOI: 10.1049/IET-CVI.2013.0301.

Xiaochen Dai et al: "Geometry-Based Object Association and Consistent Labeling in Multi-Camera Surveillance," IEEE Journal on Emerging and Selected Topics in Circuits and Systems, IEEE, Piscataway, NJ, USA, vol. 3, No. 2, (Jun. 2013), pp. 175-184, XP011514308, ISSN: 2156-3357, 001:. 10.1109/JETCAS.2013. 2256819.

Bogdan Kwolek: "Multi Camera-Based Person Tracking Using Region Covariance and Homography Constraint," Advanced Video and Signal Based Surveillance (AVSS), 2010, Seventh IEEE International Conference On, IEEE, Piscataway, NJ, USA, Aug. 29, 2010 (Aug. 29, 2010), pp. 294-299, XP031772072, ISBN: 978-1-4244-831 0-5.

Xu Ming et al: "Multi-view Pedestrian Detection Using Statistical Colour Matching," 2015 IEEE International Conference On Multimedia Big Data, IEEE, (Apr. 20, 2015), pp. 300-305, XP033173483, DOI: 10.1109/ BIGMM.2015.84.

* cited by examiner

SYSTEM AND METHOD FOR SYNCHRONIZING 2D CAMERA DATA FOR ITEM RECOGNITION IN IMAGES

BACKGROUND

Visually recognizing objects is a task that is very simple for humans to perform, but very difficult for machines. Computer vision attempts to automate tasks that are performed by the human visual system. Computer vision includes the automatic extraction and analysis of information contained within a single image or series of images. Analysis of the information contained within one or more images can include object recognition, which finds and identifies objects in the one or more images. Objects can be identified using edge detection, image segmentation, greyscale matching, gradient matching, feature detection, and the like. Object recognition can be performed using artificial intelligence and machine learning, such as deep learning based on artificial neural networks, and the like. Although the accuracy of computer vision systems is constantly improving, design engineers often make trade-offs when designing systems between cost, speed of detection, and performance accuracy.

Current solutions to object recognition are limited in the ability to quickly identify objects from a large number of known objects, especially when objects in the captured images are in an uncontrolled environment where objects can be situated in a variety of positions. To solve for that challenge, some system rely on the use of three-dimensional ("3D") cameras. However, 3D cameras are expensive to implement in mass-produced object recognition systems and have difficulty segmenting separate objects from one another when objects are in close proximity to other objects. Simpler barcode scanning systems require that objects be in a particular position, limit scanning to a single object at a time, and require that the bar code on the object not be obstructed or damaged. Such complexity increases the cost of the solution and limits the widespread adoption of vision systems in certain commercial environments.

BRIEF DESCRIPTION OF THE DRAWINGS

Various embodiments are disclosed in the following detailed description and accompanying drawings.

DETAILED DESCRIPTION

Figure 1A:
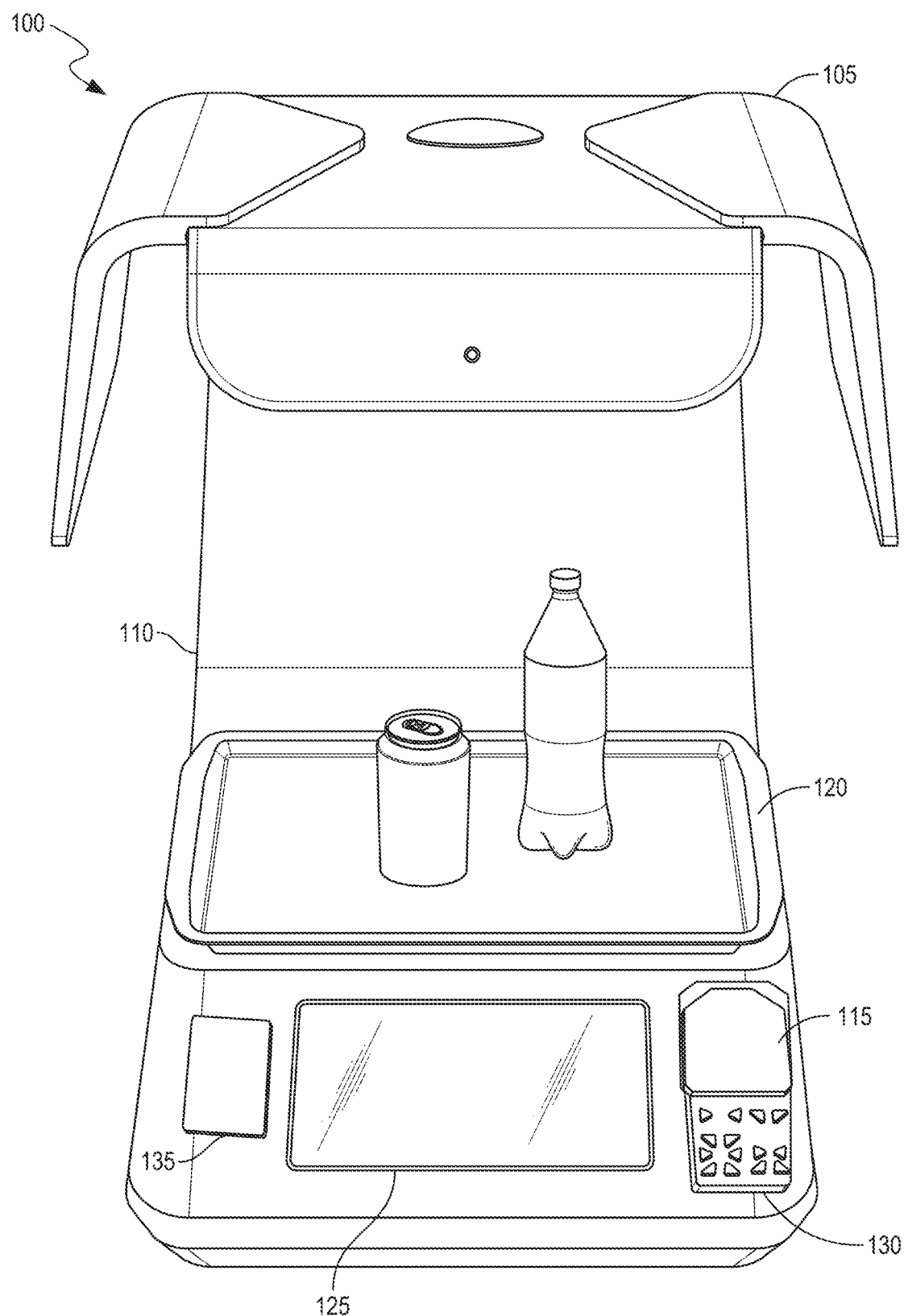
FIG. 1A illustrates a frontal view of an example object recognition kiosk according to some implementations.

A system and method for synchronizing two-dimensional ("2D") camera data for object recognition are disclosed herein. An object recognition kiosk includes a plurality of 2D cameras and a stage for placement of one or more items. The plurality of 2D cameras capture images of items on the stage from multiple angles. The images received from the 2D cameras are concatenated into a single image. The single concatenated image is processed by a trained machine learning model that analyzes and detects items present in each of the camera images that make up the concatenated image and generates 2D bounding boxes around each item. Once items are detected in the concatenated image, sensor fusion is performed based on the detected items and the bounding boxes to synchronize the image data from each of the cameras. The sensor fusion process enables the system to accurately identify the one or more items that are present on the stage.

In particular, the system utilizes a set of transformation matrices where each matrix provides a one-to-one pixel relationship between the plane representing the stage for a given camera perspective and the corresponding plane representing the stage as captured by a reference camera perspective. For example, in one transformation technique where the top-view camera is the reference camera perspective, detected items from different camera perspectives are related based on a proximity assessment of where a point representing each item's lower edge that contacts the stage from the various side-view camera perspectives lies, after being transformed, with respect to a point representing the corresponding edge of each item as captured by the top-view camera perspective. Using the techniques disclosed herein, the kiosk is able to generate a high degree of object recognition accuracy using less costly 2D cameras.

In situations where all items on the stage fail to be detected in the reference camera perspective, the system maintains a fallback hierarchy of camera pairs to utilize to link item inferences found in different camera images. In other words, if an image from the reference camera fails to link all item detections found in images from the other cameras, then different camera pairs are selected in a predetermined order and the linking is re-attempted. The use of different camera pairs to link item detections continues down the hierarchy until either all the item detections are linked or the last camera pair in the fallback hierarchy is reached. Using such a fallback hierarchy of camera pairs improves the object recognition accuracy in circumstances where items on the stage are fully or partially obstructed from view by one or more cameras.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1A illustrates a frontal view of an example object recognition kiosk 100. The object recognition kiosk 100 includes a plurality of 2D cameras, which are described below in relation to FIGS. 1B and 1C. The object recognition kiosk 100 can also include a top portion 105, a back portion 110, a bottom portion 115, and an object stage 120 on which items may be placed directly or indirectly (e.g., when a tray, platter, or other item-conveyance container that contains items is placed on the stage 120). The top portion 105 can support the plurality of cameras that are directed at the object stage 120 at various angles. The gathered image data from these cameras can be used to perform, among other things, object recognition of items placed on the object stage 120. Depending on context, calculations herein that refer to the "stage" either refer to the upper surface of the kiosk (if items are placed directly on the kiosk) or to the upper surface of a tray, platter, or other item-conveyance container that is placed on the kiosk. Because a tray or other item-conveyance container causes minimal change to the distance between the cameras and the stage, the item detection techniques disclosed herein are not impacted by the differences caused by placing an item directly on the stage or on a tray on the stage. In some implementations, the top portion 105 of the kiosk can also include a front-facing camera, which gathers image data of a user of the object recognition kiosk 100, such as to detect when a user is standing in front of the kiosk.

The back portion 110 supports the top portion 105 and couples the top portion 105 of the kiosk to the bottom portion 115. In some implementations, the back portion 110 can also include one or more cameras or other sensors, such as an infrared sensor or other sensor that can detect when items are present on the object stage 120.

The bottom portion 115 is coupled to the back portion 110 and provides a base for the back portion 110 and the object stage 120. The bottom portion 115 can also include a display screen 125, a payment processing device 130, and an RFID reader 135. The display screen 125 can display information related to items identified by the object recognition kiosk 100, such as an identity of the one or more items, a value of one or more of the identified items, a combined value of the one or more identified items, a serial number of the one or more identified items, a manufacturer of the one or more identified items, and other information associated with the one or more identified items. The display screen may also display an interface to a kiosk user to allow the user to help disambiguate the identity of items that are detected on the kiosk stage.

The payment processing device 130 can process payments from a user of the object recognition kiosk 100. For example, a user of the object recognition kiosk 100 can use a payment card or a mobile device (e.g., a phone or watch) and swipe in a magnetic stripe reader (not shown), tap or hold near the RFID reader 135, or otherwise use the payment card or mobile device to interact with the payment processing device 130 to provide payment for the one or more identified items. In some implementations, the payment card can be a credit card, a debit card, a gift card, an ATM card, a user identification card linked to a user payment account or payment means, and the like. The RFID reader 135 can also be used to scan employee badges for purposes of assisting with kiosk operation or to correct or troubleshoot kiosk issues.

Although not depicted in FIG. 1A, the kiosk 100 may also have other peripherals integrated or attached to the kiosk, such as a barcode scanner or a printer. The barcode scanner can be used as an alternative mechanism to enter the identity of items that cannot be determined by the objection recognition system. The printer may be used to print receipts or item lists for the user.

Figure 1B:
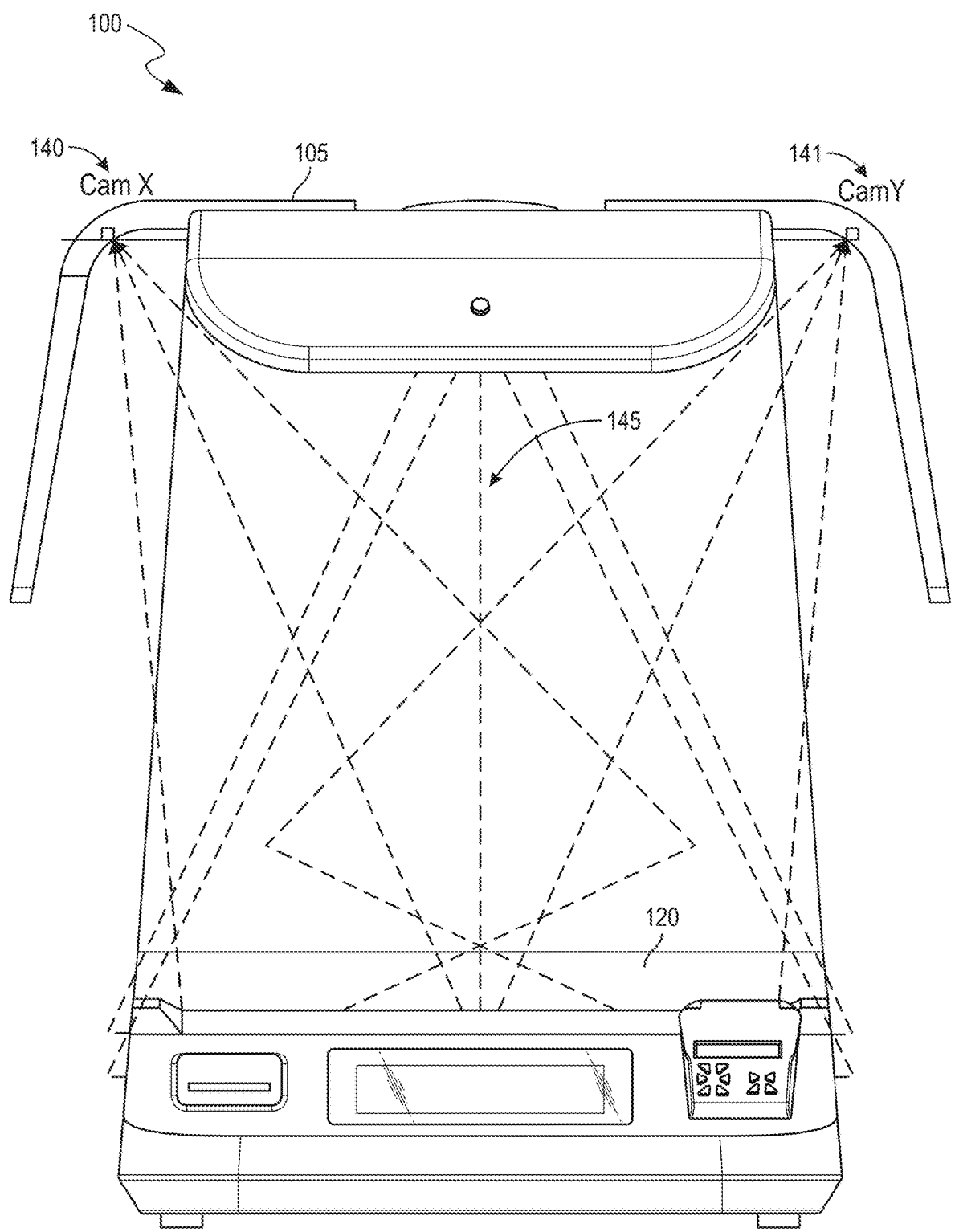
FIG. 1B illustrates a front view of the object recognition kiosk depicting the positioning of two side cameras.

FIG. 1B illustrates a front view of the object recognition kiosk 100 with two cameras 140-141 (labeled "Cam X" and "Cam Y" in the figure). Cameras 140 and 141 are positioned longitudinally from a center line 145 of the object recognition kiosk 100, such as being mounted on the top portion of the object recognition kiosk 100. Cameras 140 and 141 are directed at the object stage 120 and capture images of items placed on the object stage 120 from different longitudinal angles. In some implementations, cameras 140 and 141 capture side views of items that are placed on the object stage 120. Cameras 140 and 141 are mounted at known angles to a horizontal plane parallel to the object stage 120. The different angles are either fixed from manufacture of the object recognition kiosk 100 (e.g., the different angles can be positive and negative thirty-degree angles relative to the center line 145) or can be calculated based on one or more reference points on the object recognition kiosk 100, such as by calculating the angle(s) based on a known distance from each camera 140-141 to a center or other point on the object stage 120.

Figure 1C:
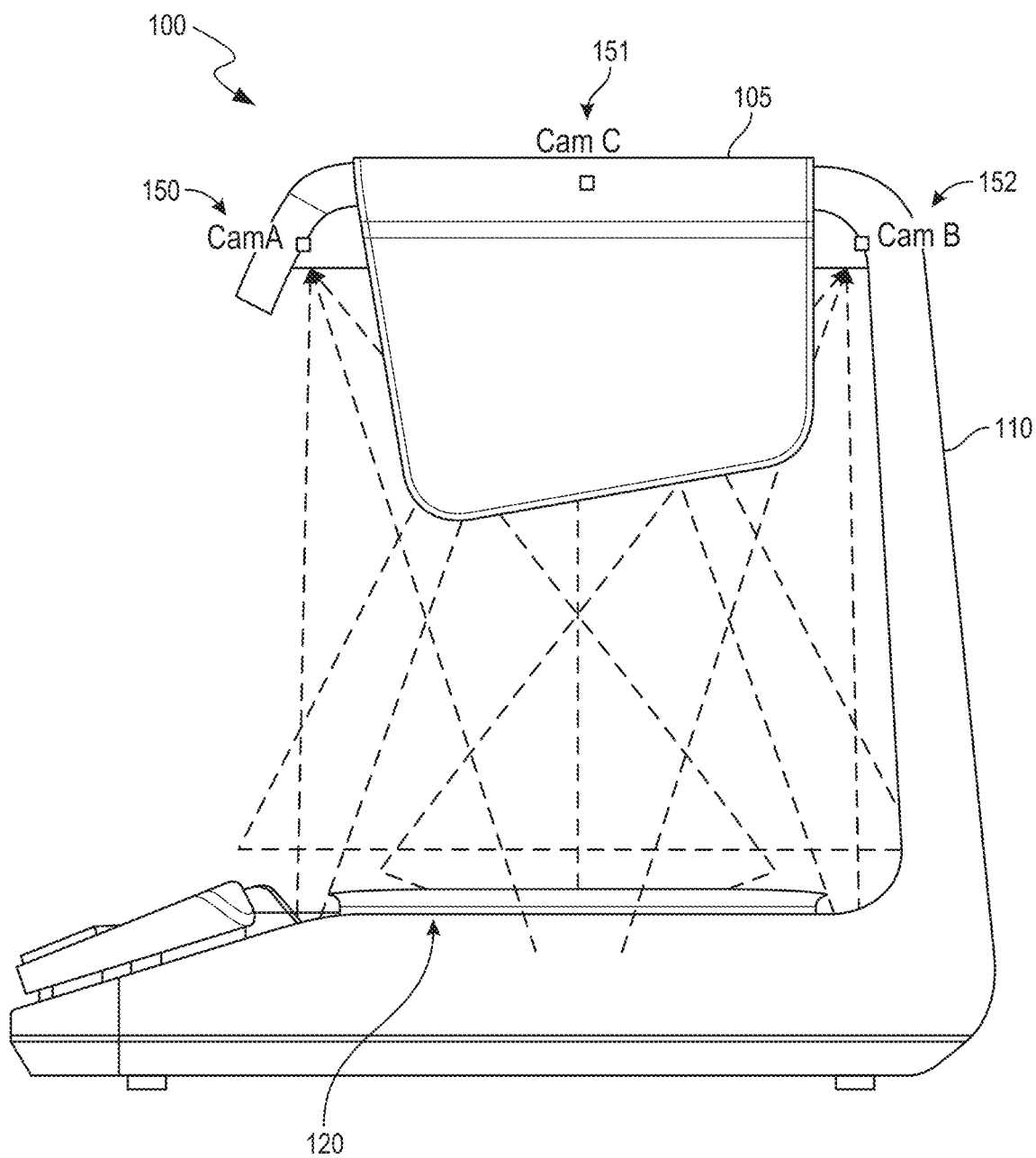
FIG. 1C illustrates a side view of the object recognition kiosk depicting the positioning of three cameras, including a front camera, a rear camera, and a top camera.

FIG. 1C illustrates a side view of the object recognition kiosk 100 with three cameras 150, 151, and 152 (labeled "Cam A," "Cam C," and "Cam B" respectively in the figure). In some implementations, cameras 150-152 are positioned approximately laterally along a center line of the object recognition kiosk 100. Like cameras 140 and 141, cameras 150-152 can be mounted on the top portion 105 of the kiosk. Camera 152, sometimes referred to as the rear camera, can be mounted on the top portion 105 or the back portion 110 of the object recognition kiosk 100, and camera 150, sometimes referred to as the front camera, can be mounted on the top portion 105 of the kiosk. Camera 151 (Cam C) is directly above the stage and captures a top-down view of items on the object stage 120. As will be described herein, top camera 151 is typically used as the reference camera perspective during system operation. Cameras 150 and 152 (Cam A and Cam B) are directed at the object stage 120 at known angles to a horizontal plane parallel to the object stage 120, and capture side views of items that are placed on the object stage 120. The various angles can be known angles from manufacture of the object recognition kiosk 100 or can be calculated based on one or more reference points on the object recognition kiosk 100.

The dashed lines in FIGS. 1B and 1C are representative of the field of view of each camera located in the top portion 105 of the kiosk. As depicted in the figures, the fields of view overlap at the object stage 120, but provide different perspectives of the object stage due to the mounting orientation of each camera. Although two cameras 140 and 141 are depicted in the front view, and three cameras 150, 151, and 152 are depicted in the side view, it will be appreciated that a greater or lesser number of cameras may be positioned on the kiosk. In one embodiment, however, five cameras have been found to be a reasonable trade-off to ensure high object detection accuracy at a reasonable cost. Cameras 140, 141, 150, 151, and 152 are two-dimensional (2D) cameras, meaning that they capture images of items without also recording distance or depth information associated with those items.

Figure 2:
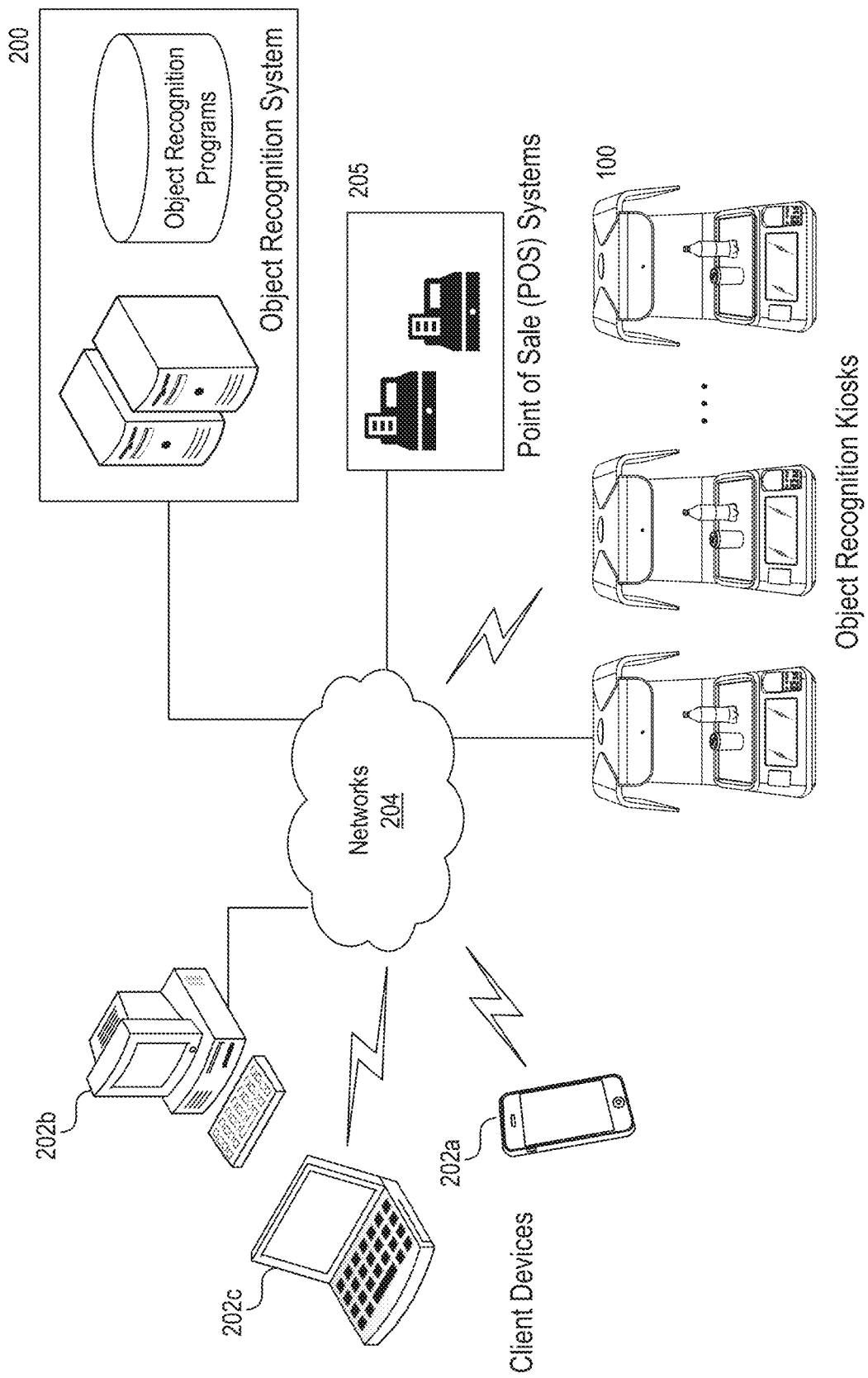
FIG. 2 illustrates an example environment in which an object recognition system operates.

FIG. 2 illustrates an example environment in which an object recognition system 200 operates. In some embodiments, the object recognition system 200 comprises one or more processors and storage devices. The object recognition system 200 has sufficient capabilities for large-scale data processing, data storage, communication, etc. The object recognition system 200 can be implemented on a cloud-computing platform, on one or more servers, on hybrid server/cloud architectures, etc. Data utilized by the system may be stored in structured or unstructured databases, flat files, or other tables.

Object recognition kiosks 100 operate as part of, or in conjunction with, the object recognition system 200. Object recognition kiosks may be located at a single site (e.g., a single business with multiple kiosks at a single physical location) or across multiple sites (e.g., a single business with kiosks distributed across multiple physical locations, or multiple businesses with kiosks in multiple locations). To communicate between the object recognition system and the object recognition kiosks, each of the system and the kiosks include communication components (not shown) to transmit data back and forth between the kiosks and the system. Such communication may take place across networks 204. Networks 204 are public or private, wired or wireless networks, such as the Internet, government, or corporate networks. Administrators or users of the system or kiosks may access various data stored by the system 200 using various client devices, such a mobile phone 202a, a desktop computer 202b, or a laptop computer 202c. Businesses using kiosks 100 typically have unique sets of items that they sell. As such, the object recognition system 200 typically segregates item data on a per business or per business location basis. Segregating item data on that basis improves item recognition, since each business or business location will have a unique set of items that machine learning techniques can be trained more efficiently to detect. In some embodiments, the objection recognition system 200 can be implemented locally on each kiosk itself or in an on-premise computing system that supports multiple kiosks within that premise. In such instances, object detection models utilized to detect items on kiosk stages may periodically be pushed to the kiosks or to the on-premise computing system to enable kiosk operation.

Kiosks 100 and object recognition system 200 may communicate with and share data with point-of-sale systems 205 that are associated with the business having the kiosks. POS systems 205 have access to a database of products to obtain a current item price, add prices of items together, perform tax calculations, add gratuity and/or service charges, and provide totals for the user to pay for selected items using a payment processing device.

Figure 3:
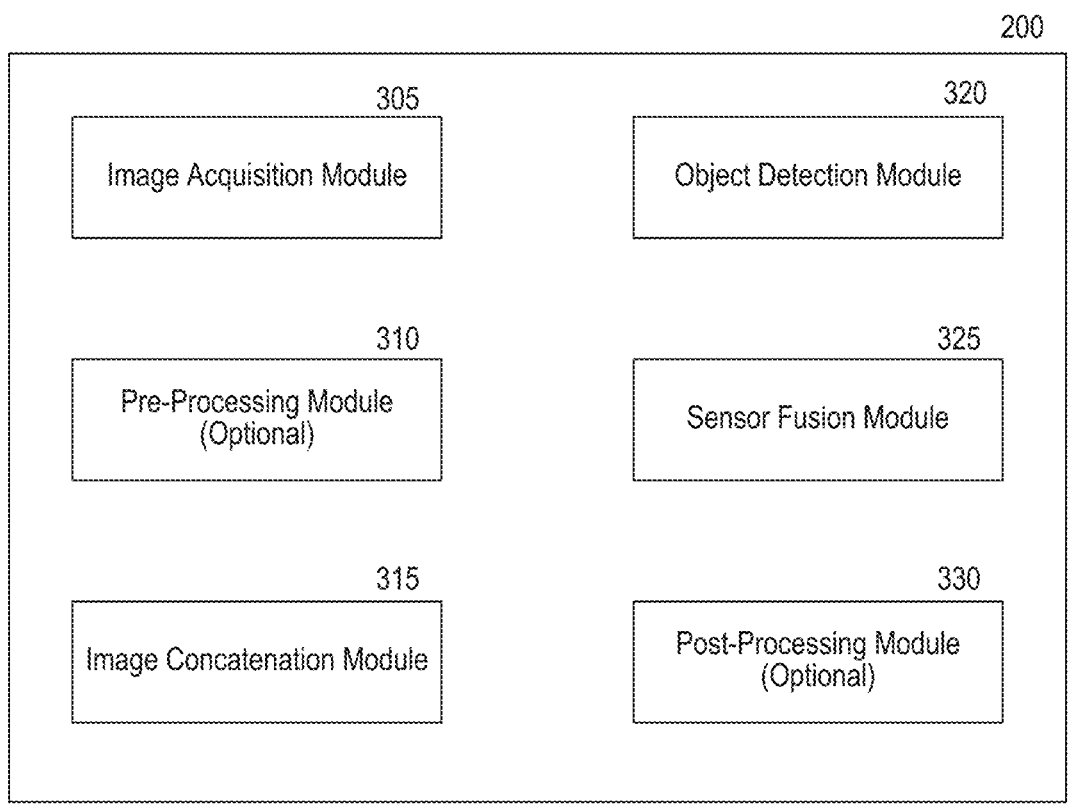
FIG. 3 illustrates a representative list of modules associated with an object recognition system.

FIG. 3 illustrates a representative set of modules of the object recognition system 200. The set of modules can include an image acquisition module 305, a pre-processing module 310, an image concatenation module 315, an object detection module 320, a sensor fusion module 325, and a post-processing module 330. The functionality of each module will be described in turn herein.

The image acquisition module 305 provides commands to cameras associated with the object recognition system 200 to gather image data and receive image data from the cameras. For example, image acquisition module 305 can receive image data captured by the cameras and store the captured images and/or video from the cameras in a memory along with an identifier of the camera that captured the images and/or video and a timestamp for later image processing. In some implementations, the image acquisition module 305 can provide commands to the cameras to capture still images, video, or a combination of the two. In some implementations, the image acquisition model 305 can also provide commands to the cameras to capture new images or video of items in response to new items being detected in an object stage of an object recognition kiosk of the object recognition system 200. Items can be detected as added to the object stage using a lightweight computer vision algorithm to track changes in images collected from one of the cameras, such as top camera 151, at a high rate and in near real time. Changes in an image feed taken by camera 151 occur when items are added or removed from the stage 120. A change in the image feed from camera 151 can therefore be used to trigger an event which causes the image acquisition module to capture the latest still images from all cameras. The still images from all cameras reflect the latest state/scene of the stage after an item change occurs and the scene has stabilized (e.g., after no movement is detected on the stage for a threshold period). The event trigger for image capture ensures that the object detection occurs only when items are added or removed from the tray. Alternatively, the image acquisition module 305 can receive indications of new items being present from one or more sensors of the object recognition system 200 or from another module of the set of modules. Such sensors may include weight sensors which detect weight being added to, or removed from, the stage, or infrared sensors which detect the presence of items or a user.

The pre-processing module 310 optionally processes image data to improve image quality by either suppressing unwanted distortions and/or enhancing important image features. Such pre-processing improves the performance of other modules such as the object detection module 320 or sensor fusion module 325. Representative pre-processing steps may include, but is not limited to, image resizing, image denoising, image compression, decompression, file type conversion, or bit rate conversion, and the like for later image processing by other modules of the set of modules. Pre-processing the captured images may or may not be required depending on the quality of the collected images resulting from, for example, the environment in which kiosks 100 operate.

The image concatenation module 310 concatenates images stored in a memory into one concatenated image. The image concatenation module 310 accesses a memory to obtain images from each camera of the object recognition system 200 and creates a single concatenated image from the accessed images. In some implementations, the image concatenation module 310 accesses the memory and identifies images from each camera by identifying a timestamp shared between each image. For example, the image concatenation module 310 can identify five different images corresponding to five different cameras of the object recognition system 200 by identifying a matching timestamp in each of the images. The images are then concatenated into a single image by "stitching" the images into a single image, or by connecting an edge of an image to another edge of a second image for each image. Concatenated images are ideal for training a machine learning model by allowing for faster training and faster inference than using individual images. In some implementations, the five images are concatenated in the configuration of a 2×3 grid, with up to two images side-by-side in each of three rows. In circumstances where there are less images than grid locations, the image concatenation module 310 can also attach an entirely black or white image to one or more of the concatenated images. Additional details regarding concatenated images can be found below in relation to FIGS. 5, 6A and 6B.

The object detection module 320 detects items that are contained in the concatenated image being processed. Object detection includes localizing multiple items within an image by drawing a two-dimensional bounding box around each item in the image and identifying each item. In some implementation, the object identification and bounding box generation occurs simultaneously.

The object detection module 320 utilizes a trained machine learning (ML) model in order to perform object recognition on the concatenated image and detect one or more items in the images forming the concatenated image. The machine learning model can be a deep belief network, a deep neural network, a graph neural network, a recurrent neural network, a convolutional neural network, or another form of deep learning neural network. In some implementations, the object detection module utilizes the You Only Look Once (YOLOv4) object detection software which is capable of concurrently identifying items in the concatenated image and generating 2D bounding boxes around those items. The machine learning model is trained by inputting a training data set of concatenated images and using supervised training to associate the concatenated images with known items in each of the concatenated images. The training data set includes a plurality of concatenated images that contain various items, such as drinking bottles, food items, packaged goods, unexpected items (e.g., napkins, straws) and the like. During training, various weights of edges in the machine learning model are adjusted as the training data is associated with the known items. After the training data has been fully analyzed and associated with the known items in each concatenated image of the training data set, the machine learning model can take a new concatenated image as input and identify one or more items in the new concatenated image using the trained network. The object detection module 320 processes concatenated images using the ML model to identify an initial set of items in each camera image of the concatenated image. That is, the concatenated image is processed by the objection detection module 320 in order to generate a preliminary identification of items in each camera image of the concatenated image. Items preliminarily identified in each camera image are sometimes referred to herein as "inferred items," since items detected in this fashion are later reconciled in a data fusion process to determine actual items on the stage.

The object detection module 320 also generates a two-dimensional axis-aligned bounding box for each detected item in each image. A 2D bounding box defines a rectangular area within the image that wholly contains an item. A 2D bounding box associated with each item can be created in each portion of the concatenated image (i.e., in each of the images used to create the concatenated image). The constructed 2D bounding boxes facilitate operation of the sensor fusion module 325 to synchronize data from each camera. An example of one or more 2D bounding boxes can be found in FIGS. 6A and 6B.

Several advantages flow from the object detection module 320 operating on a single concatenated image rather than individual camera images. One advantage is that a single object detector pipeline can be used to handle images from all cameras instead of employing dedicated object detector pipelines associated with each camera. For example, for a system with five cameras, only a single object detector pipeline needs to be trained and used rather than five object detector pipelines. The resulting reduction in number of processed images is more efficient and economical, saving operating costs. Another advantage is that the different viewpoints reflected in the concatenated image result in faster model training (when training the ML model) and faster inferencing (when the ML model is applied). This advantage results from item features learned during model training being re-used across different viewpoints. Still another advantage is that because different cameras capture different viewpoints of the same items, the item features shared across the concatenated image result in better generalization by the ML model. Improving generalization performance helps to reduce the likelihood of overfitting and thereby produces more accurate results in operation.

Following detection of each item in the concatenated image, the sensor fusion module 325 synchronizes data from each camera of the object recognition system 200 in order to form a single model of items on the kiosk stage. The process of sensor fusion comprises two steps: data association and data fusion. Data association allows the system to associate an item detected by different cameras to the same corresponding item on the stage. Data association is achieved by finding the correspondence between item detections found in an image from a given camera, referred to as "reference camera," and the corresponding item detections found in the rest of the other cameras. For each detected item, data is associated to a reference camera by performing one or more processing techniques, such as association by projection, association by homography, and others. Association by projection is a combination of utilizing camera offset and calculating an intersection over union value between bounding boxes of different items in different images from different cameras and associating a relative cost with each object based on the calculated intersection over union value. Association by homography utilizes a Euclidean distance determination between representative points of items in each of the images from different cameras projected onto a homographic plane. As will be described herein, association by homography may reflect special cases including, but not limited to, association by orthogonal side homography, ortho-parallel side homography, and parallel side homography. Additional processing techniques can also be used.

Following data association, the sensor fusion module 325 fuses the item inferences drawn from multiple camera viewpoints to derive a more accurate assessment of the items on the stage. For purposes of fusion, a cost matrix associated with identified items can be generated and utilized as part of the fusion process. The output from the data fusion step is the identity of each item on the stage. After data fusion, the detection accuracy for each item on the stage will be higher than compared to item detection accuracy of each individual camera.

In some implementations, during the fusion process, the sensor fusion module 325 can apply different weights to different cameras based on clarity of image, angle of the image, what portions of the recognized objects are present in the image, and other factors. In some implementations, during the fusion process, different weights can also be assigned to individual items detected by a given camera based on the number of neighboring items and their proximity to detected items. This is because, for example, in a side-view camera image, items in a highly cluttered scene can be partially visible due to high level of occlusion with close proximity neighbors. As another example, data fusion may involve assigning varying weights based on the detected classes of items for a given viewpoint. For example, upright cans or bottles of liquid look very similar when viewed from camera 151 (the top view camera) and therefore the identity of items detected based on the image from camera 151 may be assigned less weight than item detections from the other cameras 140, 141, 150, 152 which view the cans or bottles from an angle.

In situations where all items on the stage fail to be detected in the reference camera image, the sensor fusion module 325 maintains a fallback hierarchy of camera pairs so that if the initial camera designated as a reference camera fails to link all item detections by the other cameras, then other camera pairs in the hierarchy are utilized to attempt linking. The use of different camera pairs continues down the hierarchy until either all the item detections are linked or the last camera pair in the fallback hierarchy is reached.

The post-processing module 330 optionally performs additional processing in order to best determine the set of items on the object stage 120. The post-processing module enhances the accuracy of the item set information provided by the sensor fusion module 325. In some implementations, the post-processing module 330 uses temporal data and fusion to leverage the temporal information. Temporal data utilized by the post-processing module 330 can be obtained from a sequence of image frames captured as several items are placed on the object stage 120. As more items are loaded onto the object stage, additional images are captured. Items captured in multiple images can be tracked by association by projection, for example, and inferences can be drawn and fused to provide a more accurate prediction of the identity of the items on the stage. One example of fusion can be a weighted average fusion. In weighted average fusion, a weight is assigned to each item found in a frame. Higher weights can be assigned to items found in earlier time frames, as the earlier time frames include less clutter (e.g., less other items) and better views of objects placed onto the object stage earlier in placement, which makes earlier-placed objects easier to identify. In some implementations, the temporal weights can be used along with the cost matrix to identify items in the image(s). Additional details regarding the use of temporal data can be found below with regards to FIG. 12.

In some implementations, the post-processing module 330 also handles cases where there is ambiguity about the identity of an item when there have been multiple different possible item identities determined by the object detection module 320 and the sensor fusion module 325, and the determined item identity probabilities are very close to each other. In that case, the post-processing module 330 can prompt user input to resolve the uncertainty over item identity. An example of a generated prompt for a user can be found in FIG. 11.

The object recognition system 200 utilizes the results from the object detection module 320, sensor fusion module 325, post-processing module 330, and other data to identify the items on the object stage. For example, the object detection module 320 can identify a type of item (e.g., bottle of liquid, pre-packaged food, etc.), a brand of the item, and the like, for the items on the object stage. The other data can include item logos or color schemes from the concatenated image, item labels or barcodes, and the like. In some implementations, object detection module 320 can provide a set of probabilities for each item, each probability being associated with a different identity of the item. For example, an item may have a color scheme shared by two different products. The object detection module 320 can assign a probability that the item is a first product and assign a probability that the item is a second product. In some implementations, the post processing module 330 can prompt the user to select the item from the set of probabilities to obtain the correct object identity. The object identification module 320 can also provide user selections for retraining of the machine learning model. After the item identity is obtained, the system 200 transmits the list of items to a POS system that can access a database of products to obtain an item price, add the prices of the items together, and display a total for the user to pay using a payment processing device of the object recognition kiosk 100.

Figure 4:
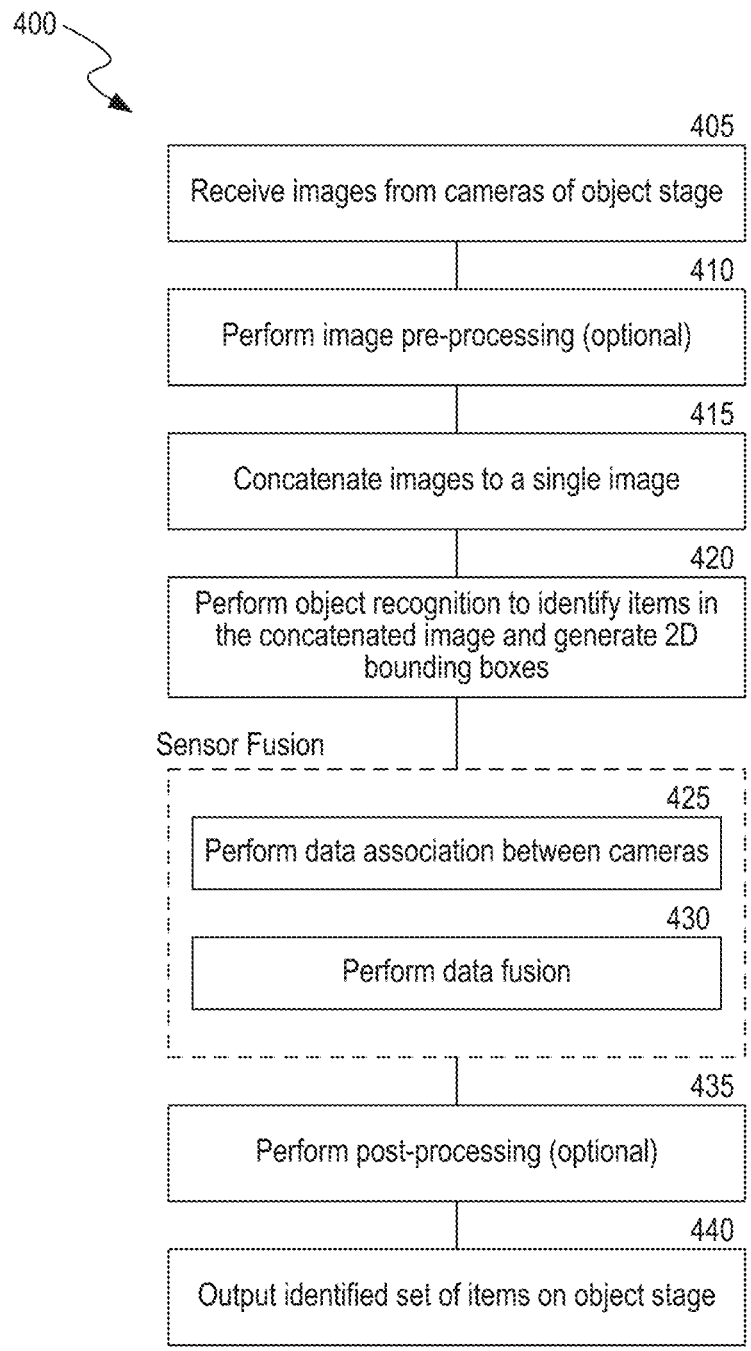
FIG. 4 illustrates a process performed by an object recognition system to perform object recognition using images from a plurality of cameras.

FIG. 4 is a flow diagram of a process 400 executed by the object recognition system 200 to perform object recognition using images from a plurality of cameras. The process 400 is executed by the object recognition system 200 in response to a camera detecting an item on an object stage, another sensor detecting an item on the object stage (e.g., a sensor that detects weight of items placed on the stage), or another indication being provided to the object recognition system 200 of an item being present on the object stage (e.g., a user selecting a "check-out" button on the payment processing device 130).

At block 405, process 400 receives images from a plurality of cameras directed at the object stage. The images are captured of an object stage containing one or more items, such as prepackaged foods, bottles of liquid, known food items, and the like. By virtue of the camera placement on the kiosk, each camera of the plurality of cameras captures a different viewpoint of the items, such as capturing images of items from different angles around the object stage. Because the images are captured with 2D cameras, the captured images do not directly contain distance or depth information associated with the items.

At a block 410, process 400 can perform preprocessing of the images to improve image quality by either suppressing unwanted distortions and/or enhancing important image features. Representative pre-processing steps may include, but is not limited to, image resizing, image denoising, image compression, decompression, file type conversion, or bit rate conversion, and the like for later image processing by other modules of the set of modules. Pre-processing the captured images may or may not be required depending on the quality of the collected images resulting from, for example, the environment in which kiosks 100 operate.

At block 415, process 400 concatenates the received images into a single concatenated image. As mentioned above with regards to the image concatenation module 310 of FIG. 3, concatenating a plurality of images of the same objects reduces the amount of time needed to train a machine model and analyze a new set of images. The plurality of images are "stitched" together, or combined into one image by connecting edges of the images to one another. In some implementations, if the number of images in the plurality of images is odd, an extra all-black or all-white "filler" image can be added to the concatenated image to make the number of images even. In one embodiment, the images are concatenated in a grid arrangement, such as that depicted in the following table:

| Camera image #1 | Camera image #2 |
| Camera image #3 | Camera image #4 |
| Camera image #5 | Filler image |

In some implementations, camera image #1 is from center camera 151, image #2 from front camera 150, image #3 from rear camera 152, image #4 from side camera 140 and image #5 from side camera 141. Note that the particular order of the camera images in the grid does not impact subsequent processing, provided that the concatenated images are consistently constructed with camera images in the same position each time.

Figure 5:
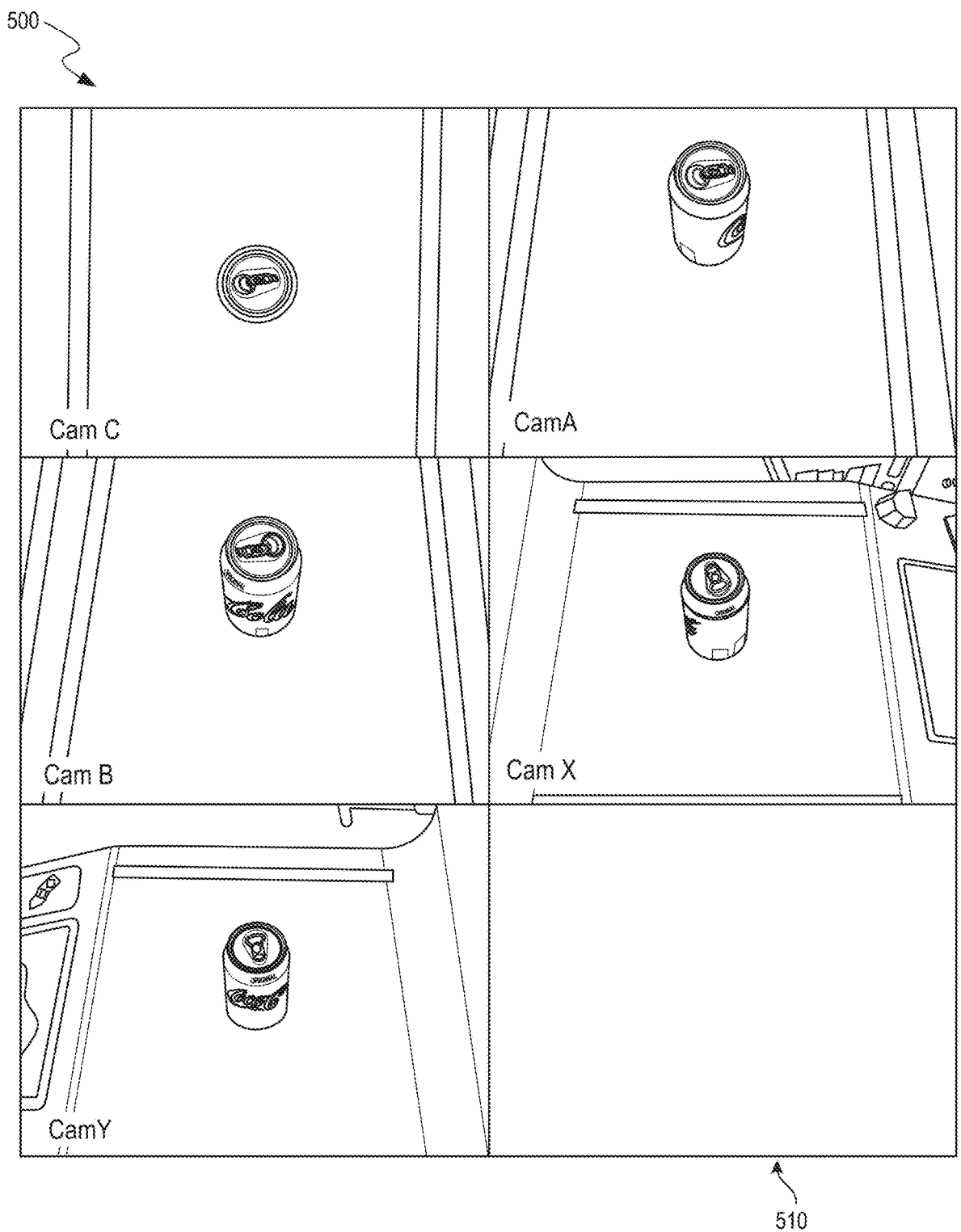
FIG. 5 illustrates a concatenated image processed by the object recognition system.

FIG. 5 illustrates a concatenated image 500 generated by the concatenation process. As shown, the concatenated image includes images from a plurality of cameras (in this case, five cameras), stitched together into one image by placing the images into a single file with edges of images connected to edges of other images. Concatenated image 500 includes images from the five cameras, plus an additional black filler image 510 that has been added to the concatenated image. As will be described herein, the concatenated image is processed by a machine learning model to recognize and identify objects contained in the image.

Returning to FIG. 4, at block 420 the concatenated image is processed by the system to detect items in the concatenated image and generate 2D bounding boxes around detected items. As was previously described, the process relies upon a machine learning pipeline where the concatenated image is passed through a model that has been previously trained (using training data) to detect items in an image. That is, the process utilizes a previously trained neural network model, where the weights of the neural network model have been determined by training the model using concatenated images of known items. Once trained, the weights of the neural network model are stored and the model used to infer items in new images. In some implementations, convolutional neural networks such as the You Only Look Once (YOLOv4) object detection model or Region-Based Convolutional Neural Networks (R-CNNs) family models are utilized to detect items in the concatenated image.

The machine learning model has been previously trained by inputting a training data set of concatenated images and using supervised training to associate the concatenated images with known items in each of the concatenated images. The training data set includes a plurality of concatenated images that contain various items, such as drinking bottles, food items, packaged goods, unexpected items (e.g., napkins, straws) and the like. During training, various weights of edges in the machine learning model are adjusted as the training data is associated with the known items. One advantage of concatenating the five camera images into a single image before processing by a machine learning model is that concatenated images work better in the training phase to train the model faster. Once the model is trained, the model also works more quickly to infer items in a concatenated image than an alternative process that would use the five camera images individually.

After training, the machine learning model can take a new concatenated image as input and identify one or more items in the new concatenated image using the trained network. Process 400 processes concatenated images using the trained ML model to identify an initial set of items in each camera image of the concatenated image. In some implementations, object recognition includes generating a probability of the recognized item being a particular known item if the process is unable to identify the item with statistical certainty. For example, certain items sold at the retail location can share similar logos, color schemes, labels, and the like. Because different items can share similar features, object identification may run into a case where a recognized item could be two or more different known items in a database based on the analysis. In this case, the machine learning model may return a probability that the item is each of the two or more known items. For example, if the item can be either of two different kinds of soda bottle that share similar logos or color schemes, process 400 may generate probabilities that the recognized item is a first known item or a second known item, such as a 75% probability that the item corresponds to a first known item and a 25% probability that the item corresponds to a second known item. Alternatively, the model may return an identity of a detected item (e.g., a can of 7-Up® soda) and a probability that the detected item has been properly identified (e.g., a 90% certainty). These probabilities are typically determined by the machine learning model or other algorithm and associated with the corresponding detected item found in each image. The same item found in different camera images may, of course, have different item identities or different item identity confidence levels depending on the performance of the machine learning model.

At block 420, the system also generates a two-dimensional bounding box for each detected item in each image. A 2D bounding box defines a rectangular area within the image that wholly contains an item. In some implementations, techniques such as edge detection, feature extraction, image segmentation, and other image processing techniques may be used to generate the 2D bounding boxes. In some implementations, the You Only Look Once (YOLOv4) object detection software concurrently generates bounding boxes while also detecting items in the concatenated image. A 2D bounding box associated with each item is created in each portion of the concatenated image (i.e., in each of the images used to create the concatenated image). The constructed 2D bounding boxes facilitate sensor fusion to synchronize data from each camera. An example of concatenated images with 2D bounding boxes can be found in FIGS. 6A and 6B.

Figure 6A:
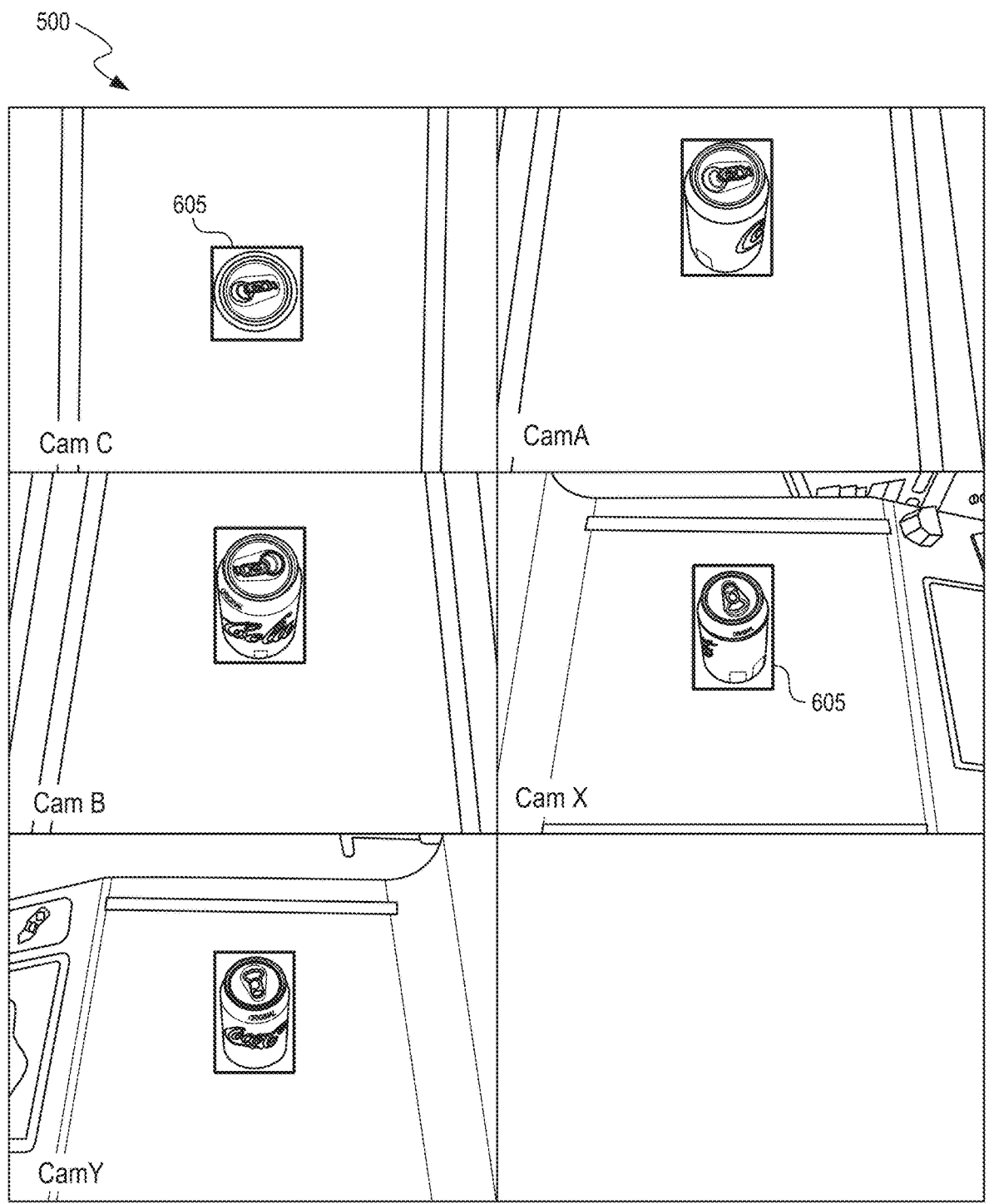
FIGS. 6A and 6B illustrate a plurality of bounding boxes overlaid on an image according to one implementation.
Figure 6B:
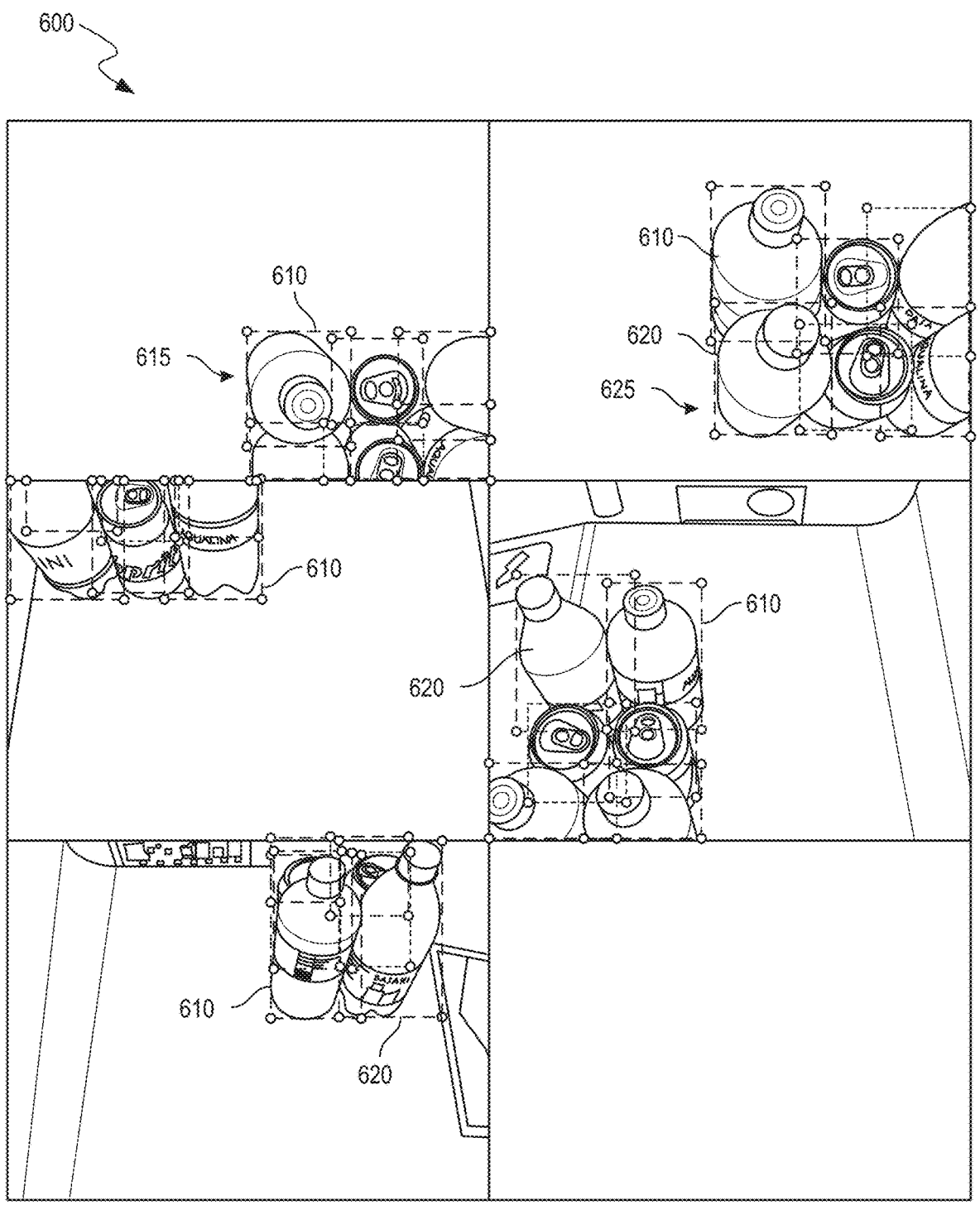

FIG. 6A depicts one example of 2D bounding boxes 605 being constructed in each image of the concatenated image 500. Each 2D bounding box 605 surrounds the entirety of the item depicted in the image, including any side portions of the item that are captured by the image because the perspective of the camera is not perfectly perpendicular to the top surface of the item. Five bounding boxes are depicted in FIG. 6A, with each bounding box surrounding the same item found in each image. In contrast, FIG. 6B depicts a concatenated image 600 that contains multiple items in each constituent image that forms the concatenated image. Six different items are found in the concatenated image 600, with 2D bounding boxes constructed around the detected items in each constituent image. Because of the placement of the items on the stage, however, not every item bounding box is present in each image. For example, a first bounding box 610, associated with a first bottle of water 615 that is on the stage, is present in each image taken from the five different camera viewpoints because the associated bottle of water is visible in all images. In contrast, a second bounding box 620 that is associated with a second bottle of water 625 is present in only three of the five images, despite the first bottle of water being directly adjacent to the second bottle of water. The omission of the second bounding box 620 from two of the images is a result of second bottle of water 625 not being within the field of view of the respective camera that took each of those images. It will be appreciated that because of item placement and obstruction of items in certain camera views, it may therefore not be possible to construct 2D bounding boxes for each item in every image.

In those circumstances, the concatenated image may not have an equal number of bounding boxes in each constituent image. Processing still continues on the concatenated images in those circumstances, with little impact on object detection efficacy.

Returning to FIG. 4, once the items have been detected, identities of the items and a probability that each item has been properly identified generated, and 2D bounding boxes generated at block 420, process 400 continues to a sensor fusion process. The sensor fusion process comprises two steps: data association at a block 425 and data fusion at a block 430. Data association is achieved by finding the correspondence between item detections found in an image from a given camera, referred to as "reference camera," and the corresponding item detections found in the rest of the other cameras. For each detected item, data is associated to a reference camera by performing one or more processing techniques, such as association by projection, association by homography, and others. Following data association, data fusion fuses the item inferences drawn from multiple camera viewpoints to derive a more accurate assessment of the items on the stage.

At a block 425, process 400 associates the data from each of the cameras to a reference camera (typically camera 151, or Cam C). For each detected item, data is synchronized to a reference camera by performing one or more processing techniques, such as association by homography. To perform the synchronization, the system employs a set of transformation matrices referred to as homography matrices. For each camera pair (e.g., camera 151 (Cam C) and camera 152 (Cam B)), there is a homography matrix which provides a one-to-one pixel relationship between the plane representing the stage for a given camera perspective (e.g., Cam B) and the corresponding plane representing the stage as captured by the reference camera perspective (e.g., Cam C). In mathematical terms:

$$\begin{pmatrix} x' \\ y' \\ 1 \end{pmatrix} \sim \underbrace{\begin{pmatrix} h_{11} & h_{12} & h_{13} \\ h_{21} & h_{22} & h_{23} \\ h_{31} & h_{32} & h_{33} \end{pmatrix}}_{\text{Homography H}} \begin{pmatrix} x \\ y \\ 1 \end{pmatrix}$$

Where (x',y',1) represents the x,y coordinates of an item point that contacts the stage for the first camera and (x,y,1) represents the x,y coordinates of the same item point that contacts the stage for the second camera. Since kiosk 100 has five cameras, the system uses a total of 10 homography transformation matrices to synchronize between each camera pair (namely, camera pairs C-A, C-B, C-X, C-Y, A-B, A-X, A-Y, B-X, B-Y, and X-Y). The homography transformations are estimated at the time of kiosk 100 set-up and configuration, and utilize the kiosk stage as the calculation plane. Because a tray placed on the stage has minimal impact on the distance between the stage and the five cameras, the homography matrices generated during kiosk set-up are used by the system whether or a not a tray is present on the stage.

Figure 7:
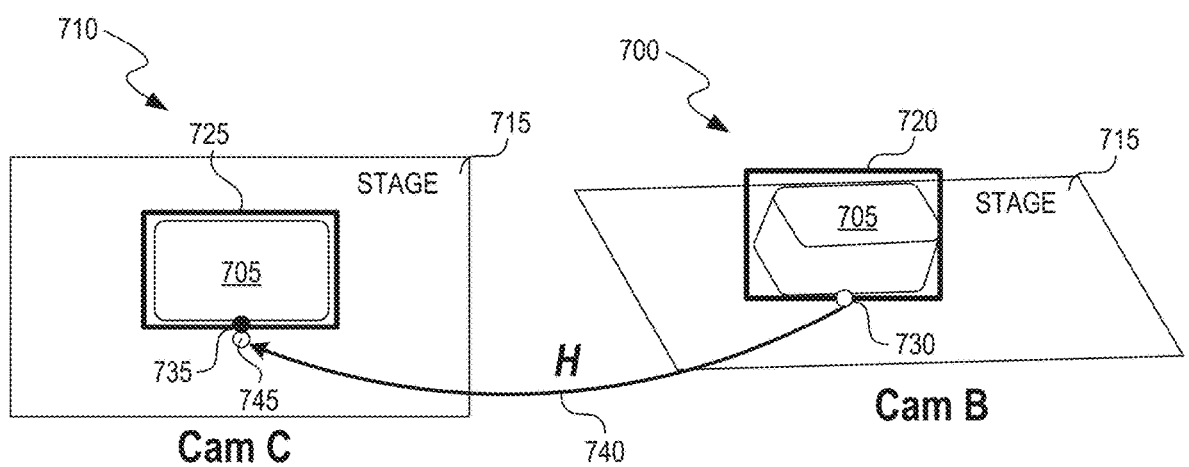
FIG. 7 is a pictorial representation of a homographic transformation used by the object recognition system.

Utilizing the homography matrices, items detected in different images are associated with each other based on a proximity assessment utilizing the point representing the item's lower edge that contacts the stage from the various side-view camera perspectives (such as Cam B), after it has been homography transformed to the reference camera perspective, such as the top-view camera (Cam C) and compared to the point representing the corresponding edge of the item as captured by the top-view camera perspective. FIG. 7 is a simple pictorial representation of this association process. In FIG. 7, two camera views are depicted of an item on the stage, a first camera view 700 is from the perspective of camera 152 (Cam B) and captures item 705 on the stage 715. A second camera view 710 is from the perspective of camera 151 (Cam C) and also captures item 705 on the stage 715. In each depicted perspective, a 2D bounding box has been generated by the object detection module 320. Bounding box 720 surrounds item 705 in the first camera view 700, and bounding box 725 surrounds item 705 in the second camera view 710. To perform the association, the center point of the nearest side of the 2D bounding box is utilized as it is closest to a point representing the item's lower edge that contacts the stage 715. As depicted in FIG. 7, a center point 730 of the near edge of the bounding box 720 is determined by the system. The coordinates of that center point are homography transformed using a homography transformation matrix 740 that is associated with camera pair C-B. The resulting location of the transformed center point 745 is compared to the location of a center point 735 of the corresponding side of bounding box 725. As will be described herein, a comparison of the distance between center points (such as center points 735 and 745) enables the system to associate items between different camera viewpoints.

Figure 8:
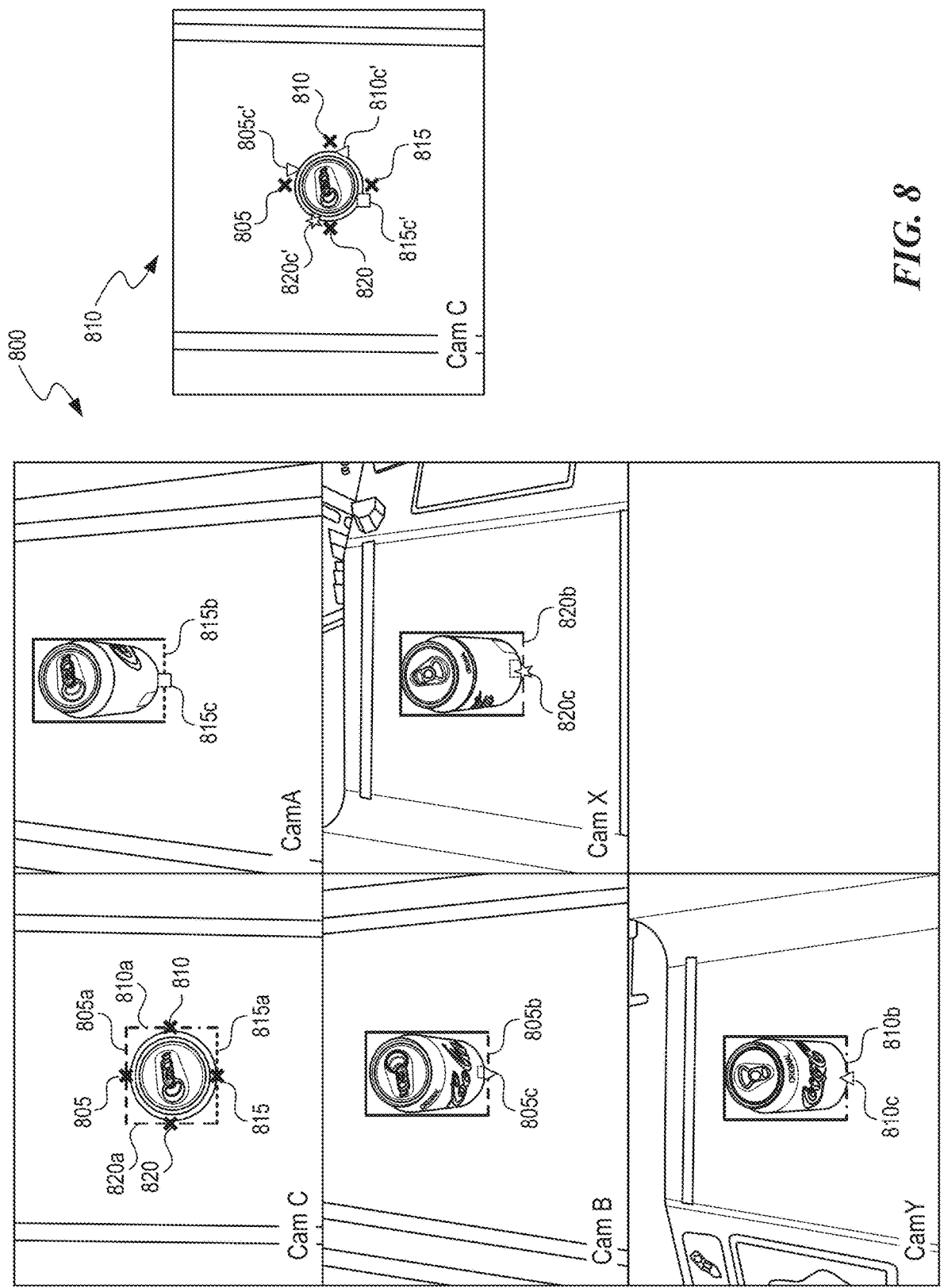
FIG. 8 depicts a data association by homography (DAbH) transformation to synchronize data between cameras.

FIG. 8 depicts an example transformation with a single item viewed from the perspective of the five cameras in a concatenated image 800. The data transformations utilize the item's axis-aligned 2D bounding box which reflects the edges of the item detected in the top viewpoint camera and in each of the side viewpoint cameras. The concatenated image 800 includes bounding boxes surrounding the detected item in the image. As shown in the top view image from camera 151 (Cam C), the bounding box has four edges 805a, 810a, 815a, and 820a that correspond to the sides of the pictured item. Each of the other cameras is oriented to the item in such a way that one of the item sides is closest to the camera, and the detected edge reflects the intersection of the base of the item with the object stage 120. For camera 150 (Cam A), the base of the closest side to the camera is identified as edge 815b in the image, for camera 152 (Cam B) the base of the closest side to the camera is identified as edge 805b in the image, for camera 140 (Cam X) the base of the closest item side is edge 820b, and for camera 141 (Cam Y) the base of the closest item side is edge 810b. These sides are referred to herein as a selective side to their corresponding camera. In summary, the selective sides for each camera are as follows: Cam C→805a, 810a, 815a, and 820a, Cam A→815b, Cam B→805b, Cam X→820b and Cam Y→810b. The center points of the selective sides are calculated by the system. The center points of the selective sides: 805a, 815a, 810a and 820a of Cam C are 805, 815, 810 and 820 respectively. The center point of selective side 815b of Cam A is center point 815c, the center point of selective side 805b of Cam B is 805c, the center point of selective side 820b of Cam X is 820c, and the center point of selective side 810b of Cam Y is 810c. Once the center points are determined, the system homography transforms the center point of each selective side from the side view cameras (i.e., Cam A, Cam B, Cam X and Cam Y) to the coordinates of the center camera (Cam C) perspective. The perspective of the top view camera (Cam C) is the reference abstract coordinate system used by data association algorithms to find the correspondence between detections across viewpoints.

Representative points (center points) from selected sides are first transformed into the "frame of reference" defined by the Cam C viewpoint, and associations are then made based on the relative positions of the transformed representative points from different viewpoints in the frame of reference.

A simulated image 810 is used for pedagogical purposes to depict the results of that transformation. Image 810 depicts the position of the center points of the selected sides of the bounding box of the side-view cameras (i.e., Cam X, Cam Y, Cam A and Cam B) after being homography transformed from their respective camera to the reference top view camera (i.e., Cam C). That is, center point 815$c$ in Cam A after homography transformation to Cam C becomes 805$c'$ with respect to the frame of reference (Cam C viewpoint), center point 805$c$ in Cam B after homography transformation to Cam C becomes 805$c'$ with respect to the frame of reference (Cam C viewpoint), center point 820$c$ in Cam X after homography transformation to Cam C becomes 820$c'$ with respect to the frame of reference (Cam C viewpoint), and center point 810$c$ in Cam Y after homography transformation to Cam C becomes 810$c'$ with respect to the frame of reference (Cam C viewpoint).

A proximity detection algorithm is then used by the system to associate transformed center points from side-view cameras with center points from the top view camera and define an association between corresponding edges of the detected item. For example, a nearest neighbor matching algorithm or Hungarian method can be used for finding an associated pair for each homography transformed point in the referenced camera. For example, a detected item that contains edge 815$b$ in Cam A is associated with a detected item that contains edge 815$a$ in Cam C since center point 815$c'$ lies very close to center point 815 in the frame of reference (Cam C viewpoint). Similarly, a detected item that contains edge 805$b$ in Cam B is associated with a detected item that contains edge 805$a$ in Cam C since center point 805$c'$ lies very close to center point 805 in the frame of reference (Cam C viewpoint). Similar associations are drawn between the detected items that contain the analyzed selected sides. Each assigned center point pair then undergoes a validity test where it passes (i.e., is found to be a valid pair) if the Euclidean distance between the points is below a certain threshold value. Center point pairs that pass the validity test identify the same item (i.e., create an association between the detected item to which each center point corresponds). The transformation process described with respect to FIG. 8 is referred to as data association by homography (DAbH) and is the primary technique for performing data association between cameras when objects are visible in both the top camera (Cam C) and one or more side cameras (Cam A, Cam B, Cam X, or Cam Y).

While DAbH has been described using center point pairs associated with bounding box edges, it will be appreciated that points other than the center point could be used in the transformation process. For example, the DAbH algorithm could select one or more points along each selective side, including the endpoints of each selective side, and perform a similar transformation process and nearest neighbor matching process in order to create an association between detected items.

While only a single item is depicted in FIG. 8, the same transformation process described with respect to the single item would be applied if multiple items were present on the stage. That is, the system would calculate edges of bounding boxes around each item and center points associated with those edges. Following transformation to the frame of reference (Cam C viewpoint), the proximity detection algorithm would be used by the system to associate transformed center points from side-view cameras with center points from the top view camera and define an association between corresponding edges of the detected item. Center point pairs that pass a subsequent validity test are deemed to identify the same item (i.e., create an association between the detected item to which each center point corresponds). In this fashion, the system generates associations between multiple items in the processed images.

Figure 9A:
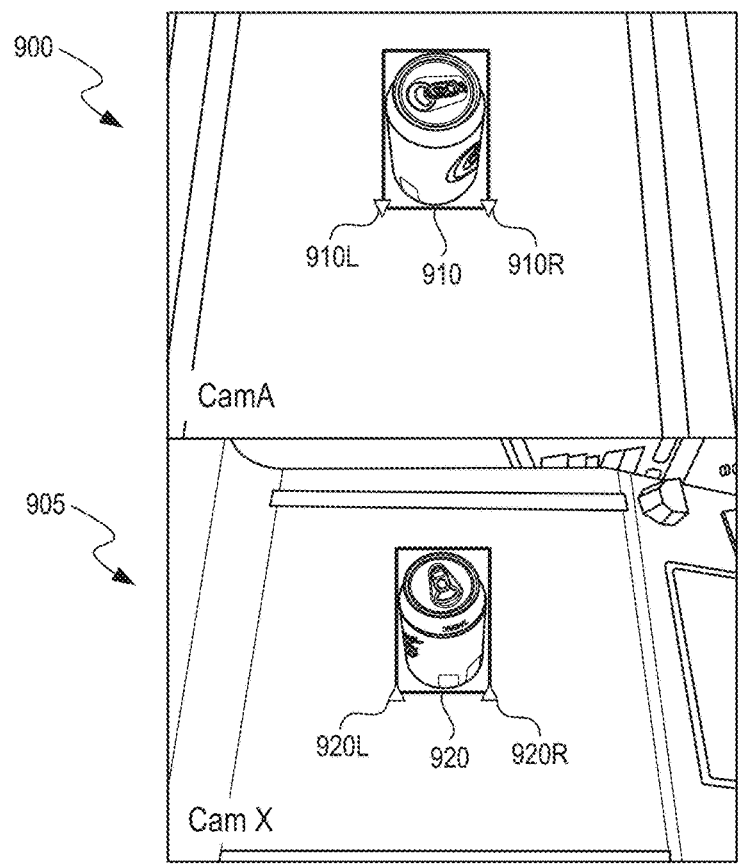
FIGS. 9A-9F depict several additional data association techniques to synchronize data between cameras.
Figure 9B:
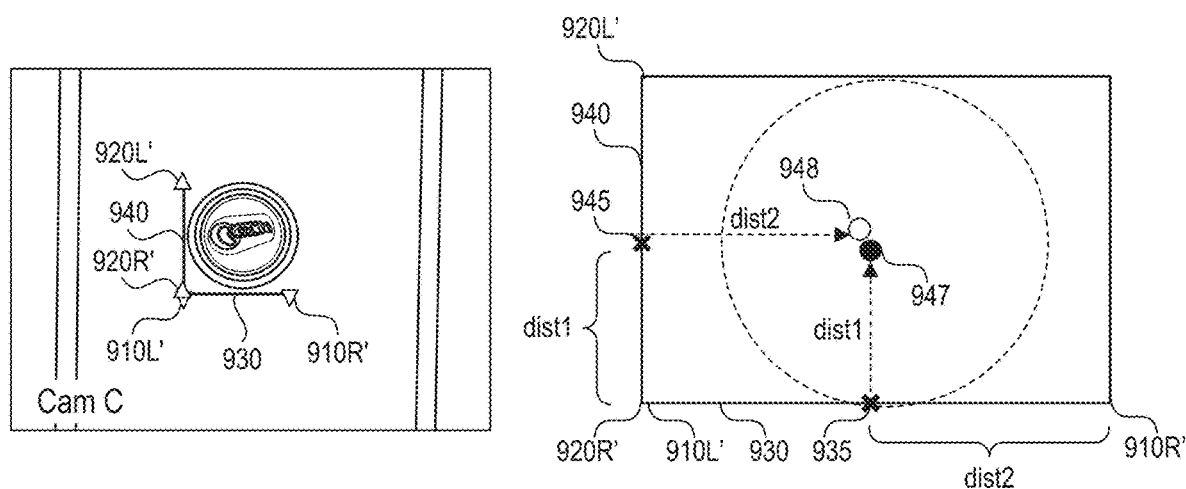

In situations in which items are detected by side cameras, however, and not clearly detected in the top (reference) camera (Cam C), other transformations may be utilized. Side cameras that are oriented at approximately right or 90-degree angles to each other are orthogonal to each other. Data association between items detected in any two orthogonal side cameras, namely between orthogonal camera pairs (Cam A, Cam X), (Cam A, Cam Y), (Cam B, Cam X) and (Cam B, Cam Y) may be made using data association by orthogonal side homography (DAbOH). FIG. 9A depicts sample images that might be used for DAbOH, namely a first image 900 from Cam A and a second image 905 from orthogonal Cam X. In the first image 900, the corner points of a selected side 910 of a bounding box around a detected item are corner point 910L and corner point 910R. In the second image 905, the corner points of a selected side 920 of a bounding box around a detected item are corner point 920L and corner point 920R. The corner points of the selected sides from the Cam A and Cam X orthogonal pair are homography transformed to the frame of reference (Cam C viewpoint). FIG. 9B provides a representation in the frame of reference (Cam C viewpoint) of the transformed selected sides derived from Cam A and Cam X. Corner points 910L and 910R of Cam A are transformed to corner points 910L' and 910R' in the frame of reference (Cam C viewpoint). Corner points 920L and 920R of Cam X are transformed to corner points 920L' and 920R' in the frame of reference (Cam C viewpoint). A side 930 joining the homography transformed point 910L' and 910R' is the homography transformation of the side 910. A side 940 joining the homography transformed points 920L' and 920R' is the homography transformation of the side 920. Since the sides 930 and 940 belong to the bounding box of the same item but from a different viewpoint, the homography transformed sides 930 and 940 can be used to reconstruct the bounding box of the item at the frame of reference (Cam C viewpoint) as shown in FIG. 9B. The midpoint of the side 930 is point 935, and the midpoint of the side 940 is point 945. The distances dist2 and dist1 in the figure represent the halfway distance of the length of the side 930 and 940, respectively.

The midpoints 935 and 945 and halfway distances dist1 and dist2 are used by the system to estimate the center of a reconstructed bounding box in the frame of reference (Cam C viewpoint). For the transformed representative midpoint 935 from Cam A, the estimated center point of the reconstructed bounding box is center point 947, which is identified by an offset of dist1 from midpoint 935. For the transformed representative midpoint 945 from Cam X, the estimated center point of the reconstructed bounding box is midpoint 948. If transformed sides 930 and 940 from the orthogonal camera viewpoints belong to the same item, the estimated center point pair of the reconstructed bounding box will closely match as shown in FIG. 9B. A nearest neighbor matching algorithm or Hungarian method can be used for finding an associated pair for each homography transformed center point in the frame of reference (Cam C viewpoint). Each assigned pair then undergoes a validity test where it passes (i.e., is found to be a valid pair) if the Euclidean distance between the points is below a certain threshold value.

For each member of a valid matched pair, the corresponding offset distance (i.e., dist1 and dist2) is recorded, which is later used for a subsequent data association process called Data Association by Ortho-Parallel side Homography (DAbO-PH). For example, for each detection in Cam A, the corresponding dist1 is recorded so that it can be retrieved later and re-used whenever that particular item detection in Cam A participates in the DAbO-PH data association process. Similarly, for each detection in Cam X, the corresponding dist2 is recorded so that it can be retrieved later and re-used whenever that particular item detection in Cam X participates in the DAbO-PH data association process.

Data transformations between any parallel cameras having opposite viewpoints, namely between side-camera pairs (Cam A, Cam B) or (Cam X, Cam Y) and the Cam C viewpoint, require a different transformation technique. There are two types of data association algorithms used by the system to deal with parallel camera pairs: data association by ortho-parallel side homography (DAbO-PH) and data association by parallel side homography (DAbPH). The difference between DAbO-PH and DAbPH is that DAbO-PH can only be applied subsequent to the application of data association by orthogonal side homography (DAbOH) since DabO-PH leverages offset information (i.e., dist1 and dist2) that was previously stored in the DAbOH process. In contrast, DAbPH does not have any kind of dependency on DAbOH.

Figure 9C:
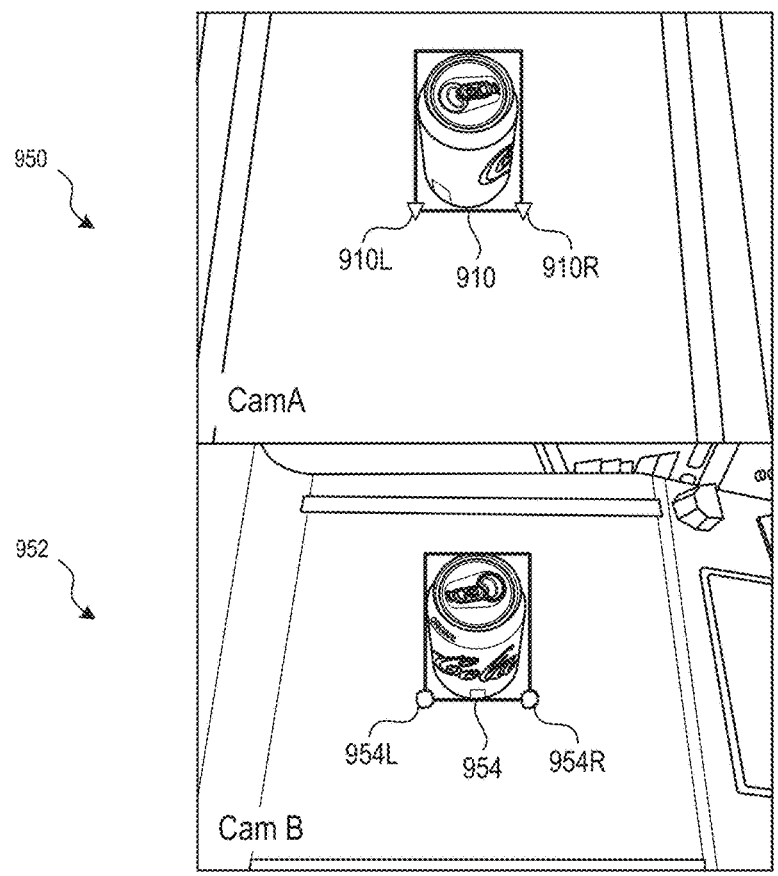
Figure 9D:
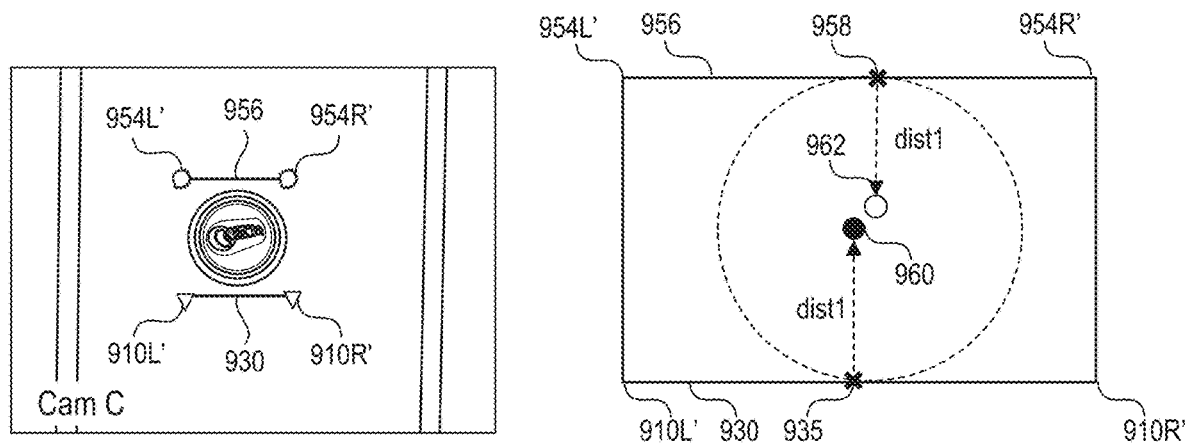

FIG. 9C depicts sample images that might be used for the first of these techniques, namely DAbO-PH. FIG. 9C includes a first image 950 from Cam A and a second image 952 from opposite viewpoint Cam B. In the first image 950, the corner points of a selected side 910 of a bounding box around a detected item are corner point 910L and corner point 910R. For purposes of DAbO-PH, Cam A has already participated in the DAbOH data association process as described in association with FIGS. 9A and 9B, so the corresponding offset information dist1 has been stored for the imaged item. In the second image 952, the corner points of a selected side 954 of a bounding box around a detected item are corner point 954L and corner point 954R. The corner points of the selected sides from the Cam A and Cam B opposing pair are homography transformed to the coordinate of the frame of reference (Cam C viewpoint). FIG. 9D provides a representation in the frame of reference (Cam C viewpoint) of the transformed viewpoint selected sides derived from Cam A and Cam B. Corner points 910L and 910R of Cam A are transformed to corner points 910L' and 910R' of the Cam C viewpoint. Corner points 954L and 954R of Cam B are transformed to corner points 954L' and 954R' in the frame of reference (Cam C viewpoint). A side 930 joining the homography transformed point 910L' and 910R' is the homography transformation of the side 910. A line 956 joining the homography transformed points 954L' and 954R' is the homography transformation of the side 954. Since the sides 930 and 954 belong to the bounding box of the same item but from a different viewpoint, the homography transformed sides 930 and 954 and the offset information dist1 can be used to reconstruct the bounding box of the item at Cam C as shown in FIG. 9D. The midpoint of side 930 is point 935, and the midpoint of side 956 is point 958.

The midpoints 935 and 958 and stored distance dist1 is used by the system to estimate the center of a reconstructed bounding box in the frame of reference (Cam C viewpoint). For the transformed representative midpoint 935 from Cam A, the estimated center point of the reconstructed bounding box would be center point 960, which is identified by an offset of dist1 from midpoint 935. For the transformed representative midpoint 958 from Cam B, the estimated center point of the reconstructed bounding box would be midpoint 962. If transformed sides 930 and 956 from the opposing camera viewpoints belong to the same item, the estimated center point pair of the reconstructed bounding box will closely match as shown in FIG. 9D. A nearest neighbor matching algorithm or Hungarian method can be used for finding an associated pair for each homography transformed center point in the frame of reference (Cam C viewpoint). Each assigned pair then undergoes a validity test where it passes (i.e., is found to be a valid pair) if the Euclidean distance between the points is below a certain threshold value.

It will be appreciated that the use of the stored distance dist1 is applicable for transformations involving Cam A. In cases where the transformation involves Cam X, the stored distance dist2 would be utilized by the system instead.

Figure 9E:
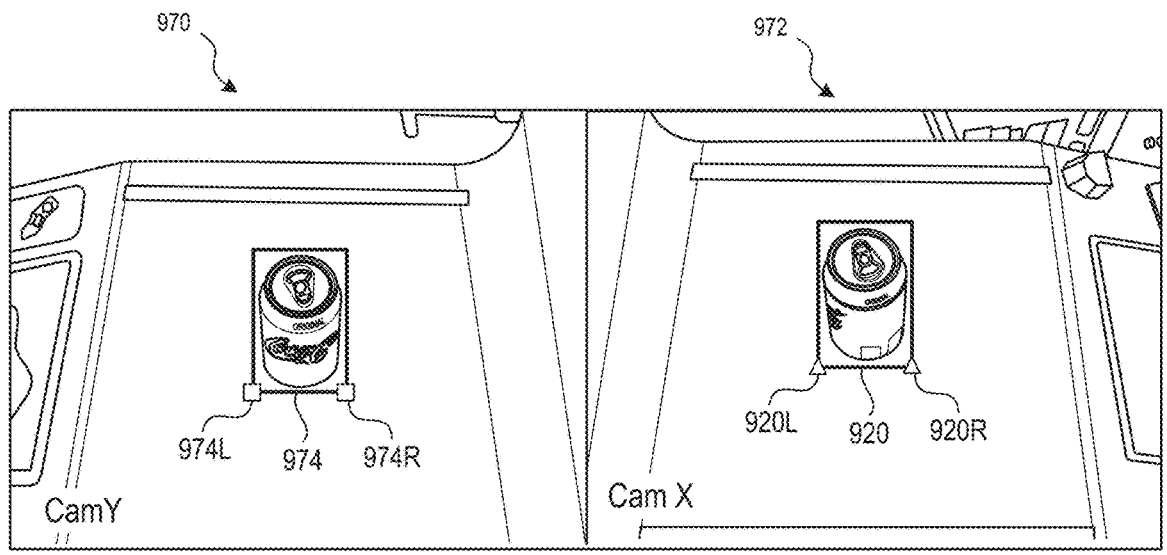
Figure 9F:
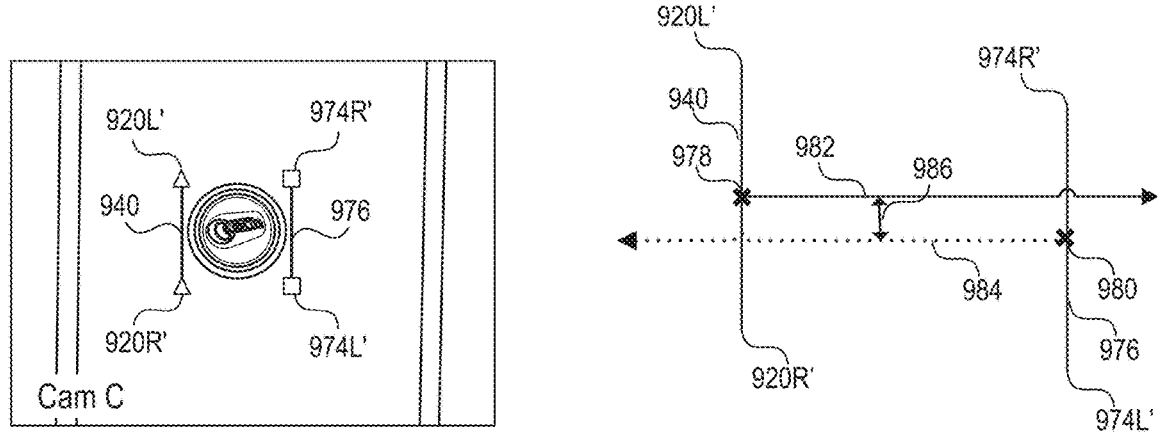

Unlike data association by ortho-parallel side homography (DAbO-PH), data association by parallel side homography (DAbPH) has no dependency on prior stored values from DAbOH. However, without the offset information, DAbPH is not as accurate as DAbO-PH. FIG. 9E depicts sample images that might be used DAbPH. FIG. 9E includes a first image 970 from Cam Y and a second image 972 from opposite viewpoint Cam X. In the first image 970, the corner points of a selected side 974 of a bounding box around a detected item are corner point 974L and corner point 974R. In the second image 972, the corner points of a selected side 920 of a bounding box around a detected item are corner point 920L and corner point 920R. The corner points of the selected sides from the Cam X and Cam Y opposing pair are homography transformed to the coordinate of the frame of reference (Cam C viewpoint). FIG. 9F provides a representation in the frame of reference (Cam C viewpoint) of the transformed viewpoint selected sides derived from Cam X and Cam Y. Corner points 920L and 920R of Cam X are transformed to corner points 920L' and 920R' in the frame of reference (Cam C viewpoint). Corner points 974L and 974R of Cam Y are transformed to corner points 974L' and 974R' in the frame of reference (Cam C viewpoint). A side 940 joining the homography transformed point 920L' and 920R' is the homography transformation of the side 920. A side 976 joining the homography transformed points 974L' and 974R' is the homography transformation of the side 974. Since the sides 920 and 974 belong to the bounding box of the same item but from a different viewpoint, the homography-transformed sides 940 and 976 can be used to partially reconstruct the bounding box of the item in the frame of reference (Cam C viewpoint) as shown in FIG. 9F. The midpoint of side 940 is point 978, and the midpoint of side 976 is point 980.

The x-coordinate of the center point of the reconstructed bounding box lies somewhere to the righthand side of the reconstructed bounding box side 940 and its y-coordinate lies close to the y-coordinate of the midpoint 978. Therefore, the center point of the reconstructed bounding box lies somewhere close to a directed line 982 which is projected from the midpoint 978 of side 940 towards the right. In a similar fashion, the x-coordinate of the center point of the reconstructed bounding box lies somewhere to the left-hand side of the reconstructed bounding box side 976 and its y-coordinate lies close to the y-coordinate of the midpoint 706. Therefore, the center point of the reconstructed bounding box lies somewhere close to a directed line 984 which is projected from the midpoint 980 of the side 976 towards the left. Because the side 940 and 976 belong to the bounding box of the same item, a distance 986 between the two parallel lines 982 and 984 should be very small. In cases with multiple items and multiple directed lines, the system utilizes total distance minimization solutions such as the Hungarian algorithm to find all the matching pairs.

It will be appreciated that the specific association processing techniques described herein are merely representative, and other association processing techniques may be used as part of the data association process.

Returning to FIG. 4, following the association of data from each of the cameras to a reference camera, processing continues to a block 430 where the system performs data fusion to fuse the item inferences drawn from multiple camera viewpoints to derive a more accurate assessment of items on the stage. In order to arrive at the best set of associated items detected by each camera and the reference camera, a cost matrix is generated by the system and populated based on the Euclidean distance calculated between the transformed representative points for each possible association pair candidates identified in one or more of the association techniques. The cost matrix is reduced to find the best set of associated items between each camera and the reference camera. In some implementations, the system uses a nearest neighbor matching algorithm or Hungarian method to analyze the Euclidean distance between the transformed representative points for each possible pair candidates in the cost matrix, determine which possible pair candidate defines the most likely association pair, and output each determined association pair. In other words, the transformed (to the frame of reference) center point location of the selective side of each item found in each image of the considered camera pair are compared to each other in order to determine whether the inferred item from each image represents the same physical item. In this manner, a relationship between instances of each item in each captured image of the concatenated image can be created.

In some implementations, during the fusion process, the system can apply different weights to different cameras based on clarity of image, angle of the image, what portions of the recognized objects are present in the image, and other factors. In some implementations, during the fusion process, different weights can also be assigned to individual items detected by a given camera based on the number of neighboring items and their proximity to detected items. This is because, for example, in a side-view camera image, items in a highly cluttered scene can be partially visible due to high level of occlusion with close proximity neighbors. As another example, data fusion may involve assigning varying weights based on the detected classes of items for a given viewpoint. For example, upright cans or bottles of liquid look very similar when viewed from camera 151 (the top view camera) and therefore the identity of items detected based on the image from camera 151 may be assigned less weight than item detections from the other cameras 140, 141, 150, 152 which view the cans or bottles from an angle.

Figure 10:
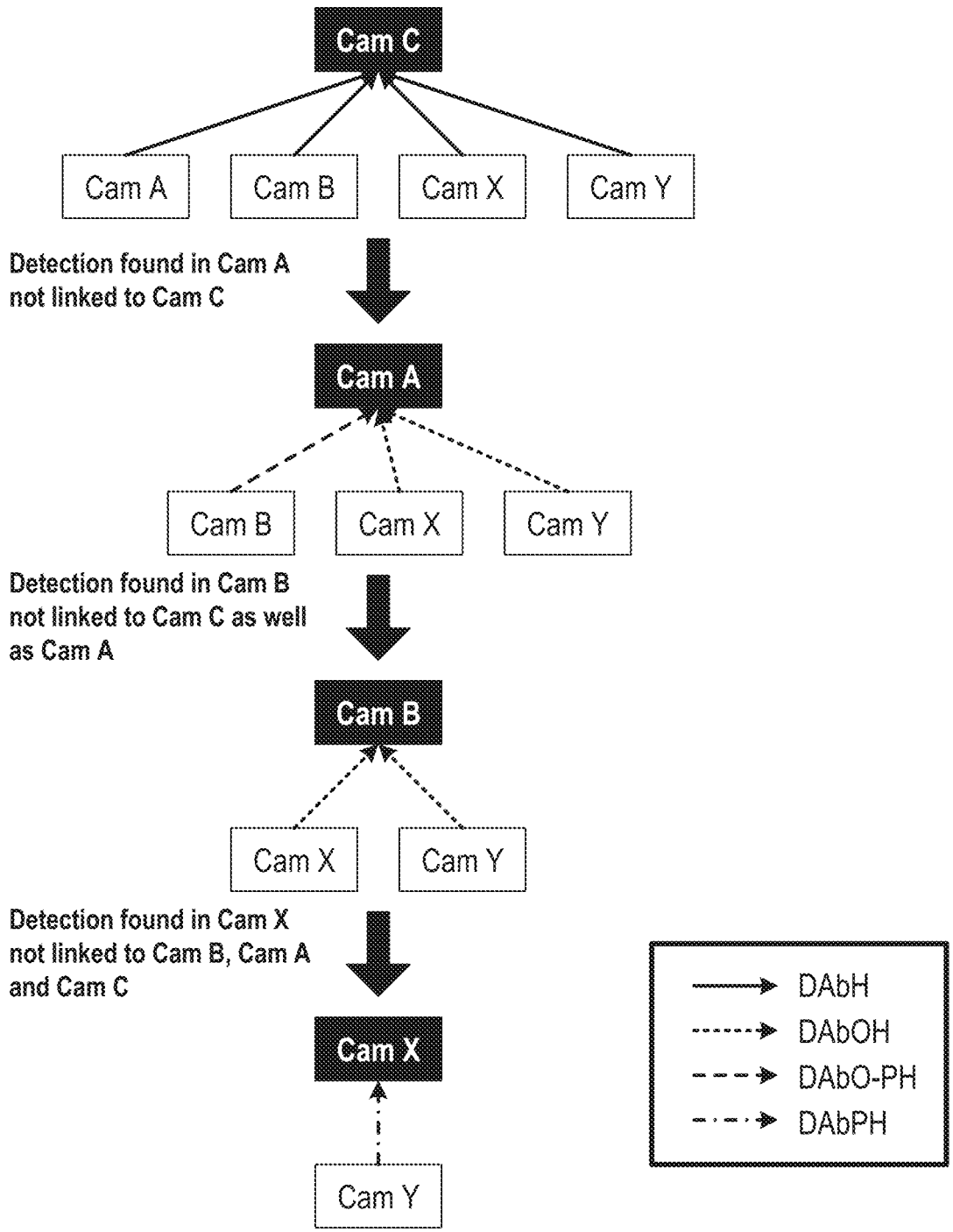
FIG. 10 is a graphical depiction of a fallback camera hierarchy used by the object recognition system.

In situations where all items on the stage fail to be detected in the reference camera image, the system maintains a fallback hierarchy of camera pairs to utilize to link item inferences found in the different camera images. In other words, if an image from the reference camera fails to link all item detections found in images from the other cameras, then different camera pairs are selected in a predetermined order and the linking is re-attempted. The use of different camera pairs to link item detections continues down the hierarchy until either all the item detections are linked or the last camera pair in the fallback hierarchy is reached. FIG. 10 is a graphical depiction of the fallback hierarchy used by the system. As shown in FIG. 10, Cam C is at the top of the fallback hierarchy. Data association by homography (DAbH) is used to link up all item detections in the side cameras (Cams A, B, X, and Y) to top view Cam C. If there is correspondence with a high degree of confidence between items detected by the top-view camera (Cam C) and all of the side-view cameras (Cams A, B, X, and Y), processing may complete. If, however, there is an item detection with high confidence at a side-view camera which cannot be linked to any item detection at Cam C, the system implements a fallback procedure. "High confidence" generally means a greater than 90% confidence in a detected item, although a greater or lesser confidence threshold may be utilized by the system.

As a first fallback, if there are items detected with high confidence in images from Cam A that are not linked to corresponding items detected in images from Cam C, the system may instead attempt to determine item correspondence between the image from Cam A and images from Cams B, X, and Y. Since, Cam A and Cam X or Cam Y belong to an orthogonal camera pair, the data association algorithm suitable to find the correspondence is data association by orthogonal side homography (DAbOH). Since Cam A and Cam B belong to a parallel camera pair, and detections in Cam A can already be linked with detections in Cam X and Cam Y, the data association algorithm most suitable to find the correspondence is data association by ortho-parallel side homography (DAbO-PH). Regardless of whether the system applies the DAbOH or DAbO-PH association algorithm, in each case the system first homography transforms item inferences in each image from Cam A, B, X or Y to the reference camera perspective (Cam C) before applying the corresponding association algorithm to link item detections in different images from those cameras.

As a second fallback, if there are items detected with high confidence in images from Cam B that are not linked to corresponding items detected in images from Cam C or Cam A, the system may instead attempt to determine item correspondence between the image from Cam B and images from Cams X and Y. Since, Cam B and Cam X or Cam Y belong to an orthogonal camera pair, the data association algorithm suitable to find the correspondence is data association by orthogonal side homography (DAbOH). Before applying the DAbOH association algorithm, the system first homography transforms item inferences in each image from Cam B, X or Y to the reference camera perspective (Cam C) before applying the corresponding association algorithm to link item detections in different images from those cameras.

Finally, as a third fallback, if there are items detected with high confidence in images from Cam X that are not linked to corresponding items detected in images from Cam C, Cam A or Cam B, the system may instead attempt to determine item correspondence between the image from Cam X and the image from Cam Y. Since, Cam X and Cam Y belong to a parallel camera pair, and the detections in Cam X and Cam Y considered here cannot be linked to any of the cameras higher up in the fallback hierarchy such as Cam C, Cam A and Cam B, the data association algorithm suitable to find the correspondence is data association by parallel side homography (DAbPH). Before applying the DAbPH association algorithm, the system first homography transforms item inferences in each image from Cam X or Y to the reference camera perspective (Cam C) before applying the -corresponding association algorithm to link item detections in different images from those cameras.

Using such a fallback processing strategy, the object recognition system 200 can accurately identify all items on the stage even when items are overlapping, partially obstructed, or completely obstructed for one or more of the cameras. The output from the data fusion block 430 is the number of items on the stage and the identity of each item on the stage. As a simple example, the system might determine that there are six soda cans on the stage, of which three are 7-Up® and three are Coca-Cola®. After data fusion, the detection accuracy for each item on the stage will be higher than compared to item detection accuracy of each individual camera.

Figure 11:
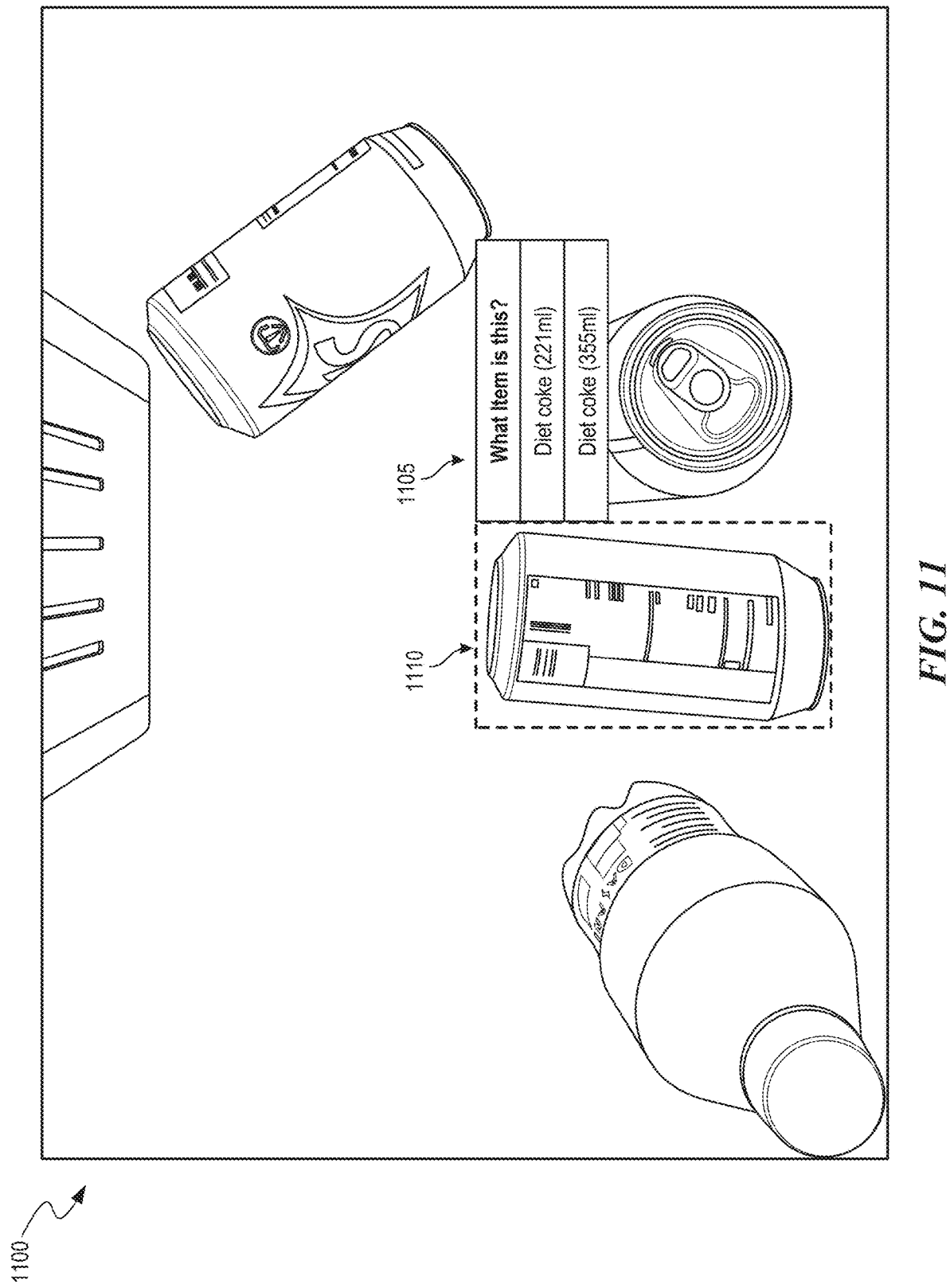
FIG. 11 is a representative display illustrating a pop-up window to allow a user to resolve ambiguity about the identity of an item.

At a block 435, process 400 may apply one or more post-processing techniques to enhance the determination of the number and identity of items represented in the concatenated image. For example, there may be remaining ambiguity about the identity of an item when there have been multiple different possible item identities determined in the object recognition step (block 420), and the determined item identity probabilities are very close to each other. This situation can occur, for example, when an object is placed with identifying logos, labels, tags, and the like are placed face-down on the object stage. In these situations, the object identification algorithm may not be able to conclusively identify the item, but it may be able to narrow the identity of the object to a limited number of possibilities. In that case, in some implementations the system can prompt a user to provide input to resolve the uncertainty over the item's identity. An example of a generated prompt for a user can be found in FIG. 11. FIG. 11 depicts a representative display 1100 for a display screen on the object recognition kiosk 100. On the display, the system has generated a pop-up window 1105 to query a user about the identity of an item on the display that is bounded with a red square 1110. The user can select which of the possible identified items is actually present on the object stage. The user can be prompted to manually identify the item from a set of one or more probable items, such as picking a particular brand of item, size if item, or other item characteristic. The user can select the proper item from the list using a touch screen or other input mechanism. After the user selects the correct item (or an option stating "none of these are my item" or something similar), process 400 identifies the item as the selected item. In some implementations, in response to the user selecting the proper item, the machine learning model can incorporate the user's selection as further training data to improve and refine the machine learning model for future identification of items.

In some implementations, as part of the post-processing performed at block 435, the system uses temporal data and fusion to leverage the temporal information. Temporal data can be obtained from a sequence of image frames captured as several items are placed on, or removed from, the object stage 120. As more items are loaded onto the object stage, additional images are captured. Items captured in multiple images can be tracked, for example, and inferences drawn and fused to provide a more accurate prediction of the identity of items on the stage. One example of fusion can be a weighted average fusion. In weighted average fusion, a weight is assigned to each item found in a frame. Higher weights can be assigned to items found in earlier time frames, as the earlier time frames include less clutter (e.g., less other items) that are likely to obstruct the camera views of items. With less obstructions, it is easier for the system to accurately detect earlier-placed items on the stage. In some implementations, the temporal weights can be used along with the cost matrix to identify items in the images.

Figure 12:
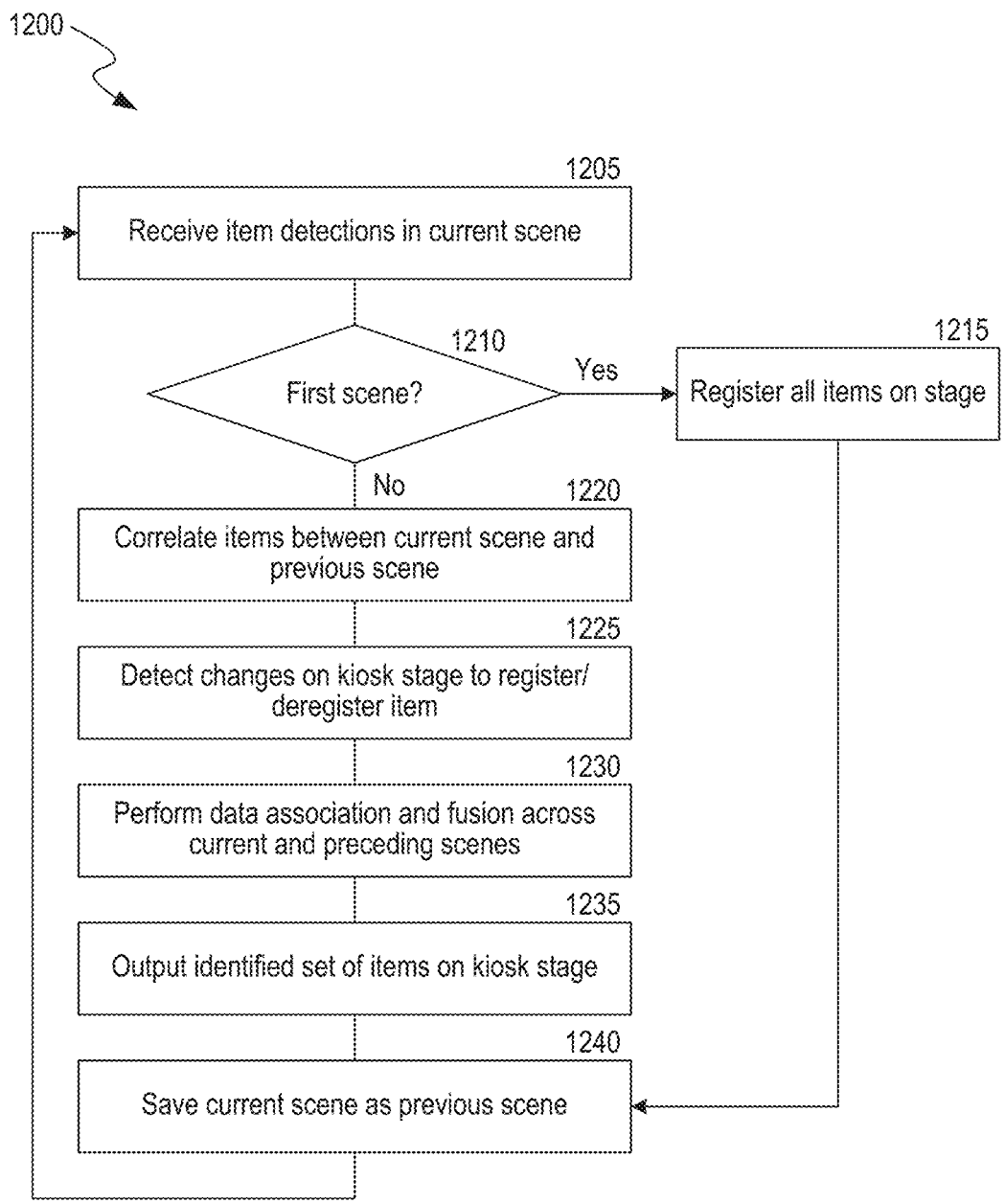
FIG. 12 is a flow diagram of a process to utilize temporal information to identify items with a higher degree of accuracy.

FIG. 12 is a flow diagram of a process 1200 executed by the object recognition system 200 to utilize temporal information to identify an item with a higher degree of accuracy. At block 1205, process 1200 receives an indication of items that are detected in the current scene (i.e., a list of all items currently on the stage, based on concurrent images taken of the stage by the kiosk). At a decision block 1201, the system determines whether this is the first scene being analyzed. A "first scene" means that a user has placed one or more new objects onto a previously empty stage. If the system determines it is a new scene, the system registers all items that are currently detected on the stage at a block 1215. These registered items will be tracked and compared with added or removed items in subsequent scenes. If at decision block 1210, the system determines that it is not the first scene (i.e., the system has stored registered items from a previous scene), processing continues to a block 1220.

At block 1220, process 1200 correlates items detected in the current scene with those items detected in the immediately preceding scene. The purpose of process 1200 is to find items in the current scene that have not changed their stage position or orientation as compared to the previous scene. In some implementations, the data association across temporal scenes is performed by the system utilizing data association by projection techniques. In some implementation, the data association across temporal scenes is performed by template matching. Template matching detects objects in a current image using a "template" containing the object from a prior image that the system would like to detect. To find the template item in the current image, the system slides the template from left-to-right and top-to-bottom across the current image. At each (x,y) location, a metric is calculated to represent how "good" or "bad" the match is between the template and the underlying current image. In some implementations, the system uses normalized correlation to determine the similarity in pixel intensities of the two patches (i.e., between the template and the portion of the underlying corresponding image) and assess the match. In some implementations, the template image is the bounding box cropped image of each item from the Cam C image of the previous scene.

At block 1225, the system analyzes the result of the correlation. The system deems an item from the previous scene as persisted to the present scene if the matching score is above a certain threshold and the pose (position/orientation) of the item remains unchanged. The process also identifies any items that are found to exist in the present scene but were absent in the previous scene at its current location. In other words, a user has added an item to the stage. When new items are detected, the system registers the added item and starts tracking the item across subsequent scenes. The process also identifies items that existed in the previous scene but are now absent in the current scene at its previous location. In other words, the user has removed an item from the stage or moved the item to a new location on the stage. For removed or moved items, the system deregisters that item at an old location and either stops tracking the item in subsequent scenes (if removed) or starts tracking the item in subsequent scenes at its new location (if moved).

At block 1230, the system generates an association between each item on the stage in the present scene and that same item across all preceding scenes back to when it first appeared on the stage. In generating the association, the system performs data fusion and assigns weights to the item identify as detected across each scene. In doing so, the system may retain greater confidence in items identified in earlier images, where the earlier images included a smaller number of items. Because there are fewer objects in earlier images (starting, for example, with only a single item), higher confidence in the identity of the item can be assumed. For example, if the system processes the first image with a single item and a second image with the additional items, the identities of any new items are received for the first time at block 1205, but the identity of the single item (found in both the first and second images) is determined twice by the system. Consequently, the system may rely on the more accurate first assessment of the identity of the single item, even if the confidence of that item identity drops in the second analysis of the system. In general, earlier images in any series of images can be used to create a more confident identification of a particular item, as fewer items exist in the image to identify.

At a block 1235, the system outputs an updated assessment of the identified set of items on the kiosk stage. That updated set is informed by the additional temporal information included in the analysis at block 1230. At a block 1240, the system saves the current scene as the previous scene. Processing then returns to block 1205 to receive the next set of items detected in the current scene. It will be appreciated that the process 1200 may restart and the first scene reset when a user checks-out, removes all items, or otherwise ceases to use the kiosk.

Figure 13:
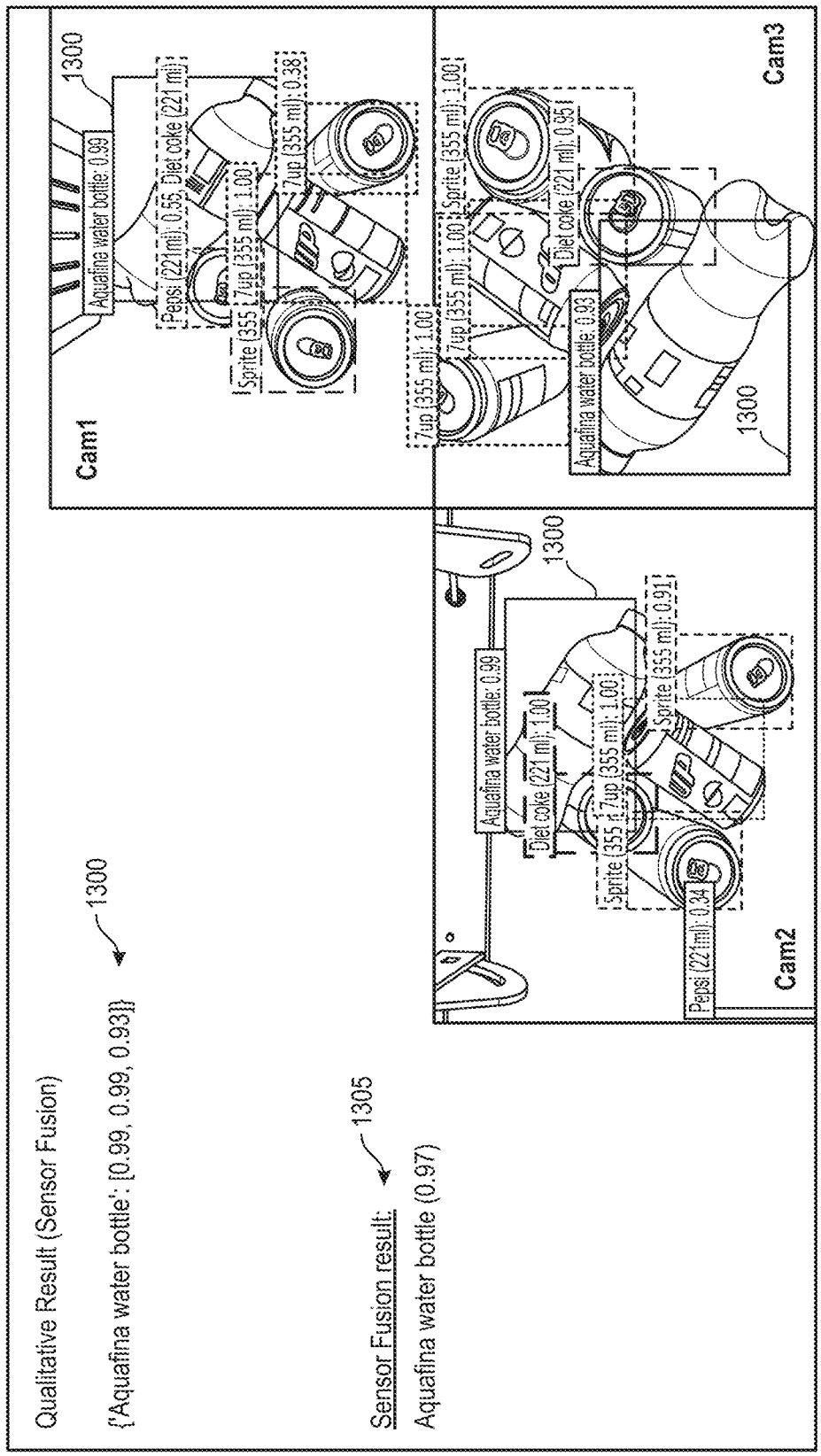
FIG. 13 is a conceptual diagram illustrating a sensor fusion result with a probability of an identity of a first object being displayed according to one implementation.

FIG. 13 is a conceptual diagram illustrating a sensor fusion result with a probability associated with each item being displayed. In FIG. 13, multiple items have been recognized and bounding boxes have been generated for each recognized item. Labels associated with each item have been generated by the system and associated with each bounding box. The labels include a name of the identified object and corresponding probabilities generated by the ML model that the identified object is the named object.

In this implementation, images from three different cameras are analyzed using sensor fusion to determine the identity of the items and assess the probability that the items match the identity determined by the object recognition system. For example, a water bottle is seen in the three images, and a probability that the water bottle is a both a water bottle and a specific brand of water bottle can be calculated for each image (probabilities 1300). These probabilities can then be averaged to determine an overall probability 1305 that the identified item is a water bottle of a specific brand. If multiple potential brands are associated with a particular item, the system selects the brand with the highest overall probability as being the likely brand. Alternatively, if multiple potential brands are associated with a particular item and the probabilities of each brand are close to one another, the system may maintain multiple brands associated with an item and seek user input to identify the correct brand.

Returning to FIG. 4, at a block 440 the process 400 outputs the identified set of items present on the object stage. The system may transmit the identified items to point of sale systems 205, where the POS system can access a stored dataset of metadata associated with the items and return one or more pieces of data associated with each identified item. For example, the POS system may return a retail price associated with an item as well as a tax treatment that should be applied to the item. In some implementations, information about the item, such as item name, item category or classification, item price, and other details about the item can be displayed or otherwise presented to the user, such as by audio announcement. In further implementations, the system can provide summaries of all identified items, such as a total price of items or total list of items, to the user. The POS system utilizes such data for purposes of allowing a customer to perform a transaction, such as the purchase of items on the object stage.

Figure 14:
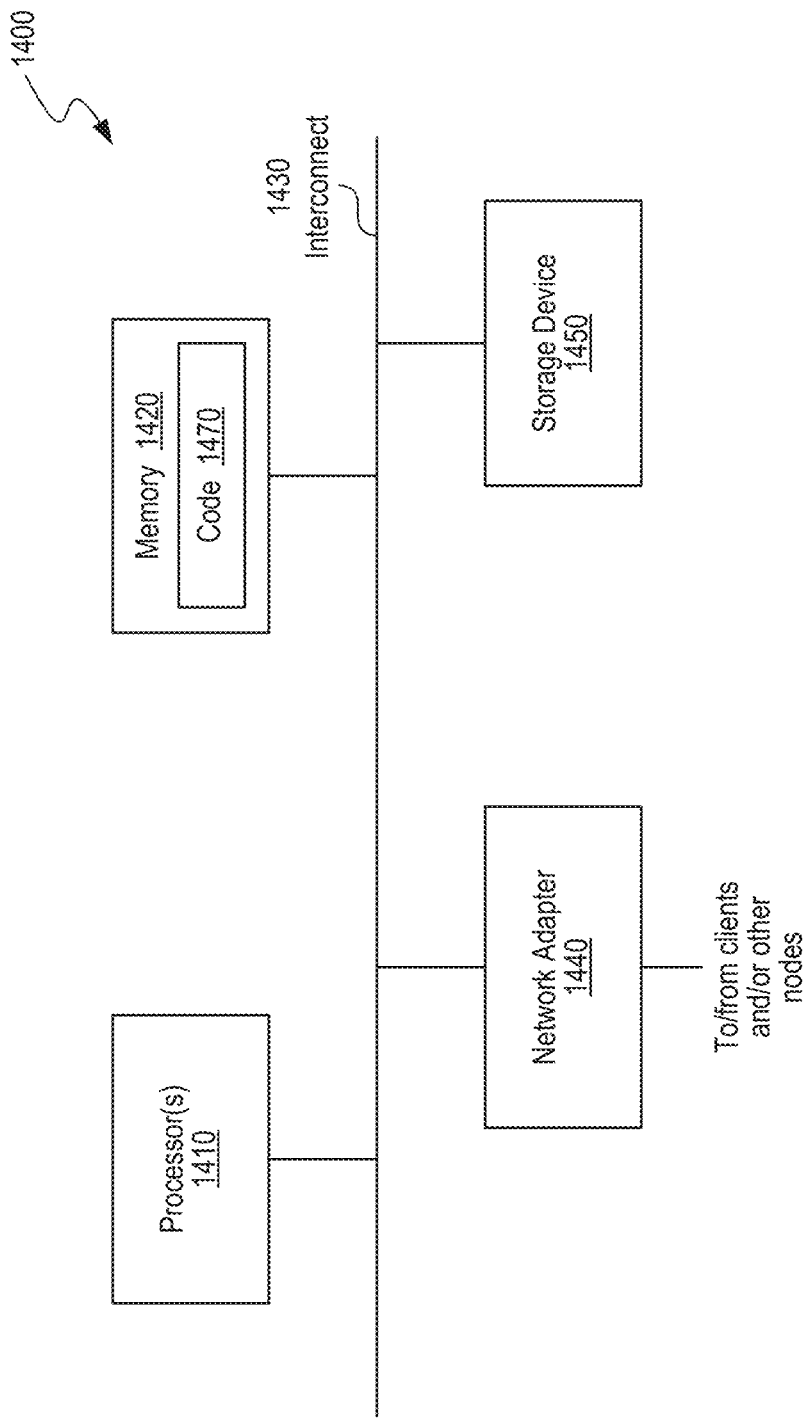
FIG. 14 contains a high-level block diagram showing an example architecture of a computing device.

FIG. 14 contains a high-level block diagram showing an example architecture of a computer, which may represent any electronic device, such as a mobile device or a server, including any node within a cloud service as described herein, such as may implement the operations described above. The computer 1000 includes one or more processor(s) 1010 and memory 1020 coupled to an interconnect 630. The interconnect 1030 shown in FIG. 12 is an abstraction that represents any one or more separate physical buses, point to point connections, or both, connected by appropriate bridges, adapters, or controllers. The interconnect 1030, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The processor(s) 1010 are the central processing unit (CPU) of the computer 1000 and thus control the overall operation of the computer 1000. In certain embodiments, the processor(s) 1010 accomplish this by executing software or firmware stored in memory 1020. The processor(s) 1010 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 1020 is or includes the main memory of the computer 1000. The memory 1020 represents any form of random-access memory (RAM), read-only memory (ROM), flash memory, or the like, or a combination of such devices. In use, the memory 1020 may contain code 1070 containing instructions according to the techniques disclosed herein.

Also connected to the processor(s) 1010 through the interconnect 1030 are a network adapter 1040 and a mass storage device 1050. The network adapter 1040 provides the computer 1000 with the ability to communicate with remote devices over a network and may be, for example, an Ethernet adapter. The network adapter 1040 may also provide the computer 1000 with the ability to communicate with other computers.

The code 1070 stored in memory 1020 may be implemented as software and/or firmware to program the processor(s) 1010 to carry out actions described above. In certain embodiments, such software or firmware may be initially provided to the computer 1000 by downloading it from a remote system through the computer 1000 (e.g., via network adapter 1040).

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced herein may be stored on a machine-readable storage medium and may be executed by one or more general-purpose or special-purpose programmable microprocessors.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A machine-readable storage medium, as the term is used herein, includes any mechanism that can store information in a form accessible by a machine (a machine may be, for example, a computer, network device, mobile phone, personal digital assistant (PDA), manufacturing tool, or any device with one or more processors, etc.). For example, a machine-accessible storage medium includes recordable/non-recordable media (e.g., ROM, RAM, magnetic disk storage media, optical storage media, flash memory devices, etc.) or other types of media.

The aforementioned flowcharts and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions, or acts or combinations of special-purpose hardware and computer instructions.

Furthermore, it is to be understood that the invention can be carried out or practiced in various ways and that the invention can be implemented in embodiments other than the ones outlined in the description above.

I claim:

1. In an object recognition system having a plurality of two-dimensional (2D) cameras for detecting an identity of items placed on a stage, a fallback method to select camera pairs for purposes of performing data association between cameras, the fallback method comprising:
designating one of a plurality of two-dimensional (2D) cameras as a first camera defining a frame of reference and identifying one or more items in an image from the first camera;
for each of the plurality of 2D cameras that are not designated as the first camera:
identifying one or more items in an image from the 2D camera;
using a first transformation technique, performing data association of the one or more items identified in the image to generate item inferences between the image from the 2D camera and the image from the first camera; and
determining whether all of the identified one or more items in the image from the 2D camera are also present in the image from the first camera; and
for each missing item found in an image from one of the plurality of 2D cameras that are not designated as the first camera, but not found in the image from the first camera:
designating a different one of the plurality of 2D cameras as a second camera; and
for each of the plurality of 2D cameras that are not designated as the first camera or the second camera:
using a second transformation technique, performing data association of the missing item identified in the image from the 2D camera and the image from the second camera to generate item inferences between the image from the 2D camera and the image from the second camera; and
determining whether all of the missing items in the image from the 2D camera are also present in the image from the second camera.

2. The fallback method of claim 1, wherein the first transformation technique is data association by homography.

3. The fallback method of claim 1, wherein the second transformation technique is either data association by orthogonal side homography or data association by ortho-parallel side homography.

4. The fallback method of claim 1, wherein the plurality of cameras comprises a top camera and four side cameras.

5. The fallback method of claim 4, wherein the top camera is the first camera.

6. The fallback method of claim 1, further comprising when a missing item is found in an image from one of the plurality of 2D cameras that are not designated as the second camera, but not found in the image from the second camera:
designating a different one of the plurality of 2D cameras as a third camera; and
for each of the plurality of 2D cameras that are not designated as the first camera, the second camera, or the third camera:
using a third transformation technique, performing data association of the missing item identified in the image from the 2D camera and the image from the third camera to generate item inferences between the image from the 2D camera and the image from the third camera; and
determining whether all of the missing items in the image from the 2D camera are also present in the image from the third camera.

7. The fallback method of claim 6, wherein the third transformation technique is data association by orthogonal side homography.

8. The fallback method of claim 6, further comprising when a missing item is found in an image from one of the plurality of 2D cameras that are not designated as the third camera, but not found in the image from the third camera:
designating a different one of the plurality of 2D cameras as a fourth camera; and
for each of the plurality of 2D cameras that are not designated as the first camera, the second camera, the third camera, or the fourth camera:
using a fourth transformation technique, performing data association of the missing item identified in the image from the 2D camera and the image from the fourth camera to generate item inferences between the image from the 2D camera and the image from the fourth camera; and determining whether all of the missing items in the image from the 2D camera are also present in the image from the fourth camera.

9. The fallback method of claim 8, wherein the fourth transformation technique is data association by parallel side homography.

10. The fallback method of claim 1, further comprising transmitting a set of identified items to a point-of-sale terminal.

11. A non-transitory computer-readable medium carrying instructions that, when executed by an object recognition system having a plurality of two-dimensional (2D) cameras for detecting an identity of items placed on a stage, cause the object recognition system to execute a fallback method to select camera pairs for purposes of performing data association between cameras, the fallback method comprising:
  designating one of a plurality of two-dimensional (2D) cameras as a first camera defining a frame of reference and identifying one or more items in an image from the first camera;
  for each of the plurality of 2D cameras that are not designated as the first camera:
    identifying one or more items in an image from the 2D camera;
    using a first transformation technique, performing data association of the one or more items identified in the image to generate item inferences between the image from the 2D camera and the image from the first camera; and
    determining whether all of the identified one or more items in the image from the 2D camera are also present in the image from the first camera; and
  for each missing item found in an image from one of the plurality of 2D cameras that are not designated as the first camera, but not found in the image from the first camera:
    designating a different one of the plurality of 2D cameras as a second camera; and
    for each of the plurality of 2D cameras that are not designated as the first camera or the second camera:
      using a second transformation technique, performing data association of the missing item identified in the image from the 2D camera and the image from the second camera to generate item inferences between the image from the 2D camera and the image from the second camera; and
      determining whether all of the missing items in the image from the 2D camera are also present in the image from the second camera.

12. The non-transitory computer-readable medium of claim 11, wherein the first transformation technique is data association by homography.

13. The non-transitory computer-readable medium of claim 11, wherein the second transformation technique is either data association by orthogonal side homography or data association by ortho-parallel side homography.

14. The non-transitory computer-readable medium of claim 11, wherein the plurality of cameras comprises a top camera and four side cameras.

15. The non-transitory computer-readable medium of claim 11, wherein the top camera is the first camera.

16. The non-transitory computer-readable medium of claim 11, wherein the fallback method further comprises when a missing item is found in an image from one of the plurality of 2D cameras that are not designated as the second camera, but not found in the image from the second camera:
  designating a different one of the plurality of 2D cameras as a third camera; and
  for each of the plurality of 2D cameras that are not designated as the first camera, the second camera, or the third camera:
    using a third transformation technique, performing data association of the missing item identified in the image from the 2D camera and the image from the third camera to generate item inferences between the image from the 2D camera and the image from the third camera; and
    determining whether all of the missing items in the image from the 2D camera are also present in the image from the third camera.

17. The non-transitory computer-readable medium of claim 16, wherein the third transformation technique is data association by orthogonal side homography.

18. The non-transitory computer-readable medium of claim 16, wherein the fallback method further comprises when a missing item is found in an image from one of the plurality of 2D cameras that are not designated as the third camera, but not found in the image from the third camera:
  designating a different one of the plurality of 2D cameras as a fourth camera; and
  for each of the plurality of 2D cameras that are not designated as the first camera, the second camera, the third camera, or the fourth camera:
    using a fourth transformation technique, performing data association of the missing item identified in the image from the 2D camera and the image from the fourth camera to generate item inferences between the image from the 2D camera and the image from the fourth camera; and
    determining whether all of the missing items in the image from the 2D camera are also present in the image from the fourth camera.

19. The non-transitory computer-readable medium of claim 18, wherein the fourth transformation technique is data association by parallel side homography.

20. The non-transitory computer-readable medium of claim 11, wherein the fallback method further comprises transmitting a set of identified items to a point-of-sale terminal.

* * * * *